US009810908B2

United States Patent
Tanahashi

(10) Patent No.: US 9,810,908 B2
(45) Date of Patent: Nov. 7, 2017

(54) VIRTUAL IMAGE DISPLAY DEVICE

(75) Inventor: Yasuo Tanahashi, Kawasaki (JP)

(73) Assignee: PIONEER CORPORATION, Kanagawa (JP)

( * ) Notice: Subject to any disclaimer, the term of this patent is extended or adjusted under 35 U.S.C. 154(b) by 580 days.

(21) Appl. No.: 14/238,240

(22) PCT Filed: Aug. 18, 2011

(86) PCT No.: PCT/JP2011/068659
§ 371 (c)(1),
(2), (4) Date: Feb. 20, 2014

(87) PCT Pub. No.: WO2013/024539
PCT Pub. Date: Feb. 21, 2013

(65) Prior Publication Data
US 2014/0218804 A1    Aug. 7, 2014

(51) Int. Cl.
*G02B 27/14* (2006.01)
*G02B 27/01* (2006.01)
*G02B 27/00* (2006.01)

(52) U.S. Cl.
CPC ..... *G02B 27/0172* (2013.01); *G02B 27/0025* (2013.01); *G02B 27/0101* (2013.01); *G02B 2027/011* (2013.01)

(58) Field of Classification Search
USPC .................................. 359/619–636
See application file for complete search history.

(56) References Cited

U.S. PATENT DOCUMENTS 4,383,740 A    5/1983    Bordovsky
5,157,503 A    10/1992    Dugdale

| 6,980,363 | B1 * | 12/2005 | Takagi | G02B 23/125 250/214 VT |
| 7,095,562 | B1 | 8/2006 | Peng et al. | |
| 7,460,305 | B2 | 12/2008 | Powell et al. | |
| 2001/0010598 | A1 * | 8/2001 | Aritake | G02B 27/0172 359/630 |
| 2005/0099606 | A1 * | 5/2005 | Fushimi | G02B 26/0841 353/31 |

(Continued)

FOREIGN PATENT DOCUMENTS

JP    6-500413    1/1994
JP    08-029723   2/1996

(Continued)

OTHER PUBLICATIONS

Exteneded European Search Report—11 871 097.9—dated May 8, 2015.
International Search Report—PCT/JP2011/068659—dated Sep. 20, 2011.

*Primary Examiner* — Brandi Thomas
(74) *Attorney, Agent, or Firm* — Young & Thompson

(57) ABSTRACT

A virtual image display device includes: an image forming element which forms an image to be displayed; and an optical element which reflects a light emitted from the image forming element to display a virtual image. The optical element has a concave shape opposite to a traveling direction of the light emitted from the image forming element. The light emitted from the image forming element enters the optical element without being reflected by other optical element. The image forming element is arranged in a direction substantially orthogonal to a direction of viewing the virtual image through the optical element.

12 Claims, 20 Drawing Sheets

(56) References Cited

U.S. PATENT DOCUMENTS

2010/0177192 A1* 7/2010 Ishigaki ................ G01B 11/25
348/135

FOREIGN PATENT DOCUMENTS

| JP | 08-304734 | 11/1996 |
|----|-----------|---------|
| JP | 2004-102204 | 4/2004 |
| JP | 2009-150947 | 7/2009 |
| JP | 2010-164944 | 7/2010 |
| JP | 2010-274803 | 12/2010 |

* cited by examiner

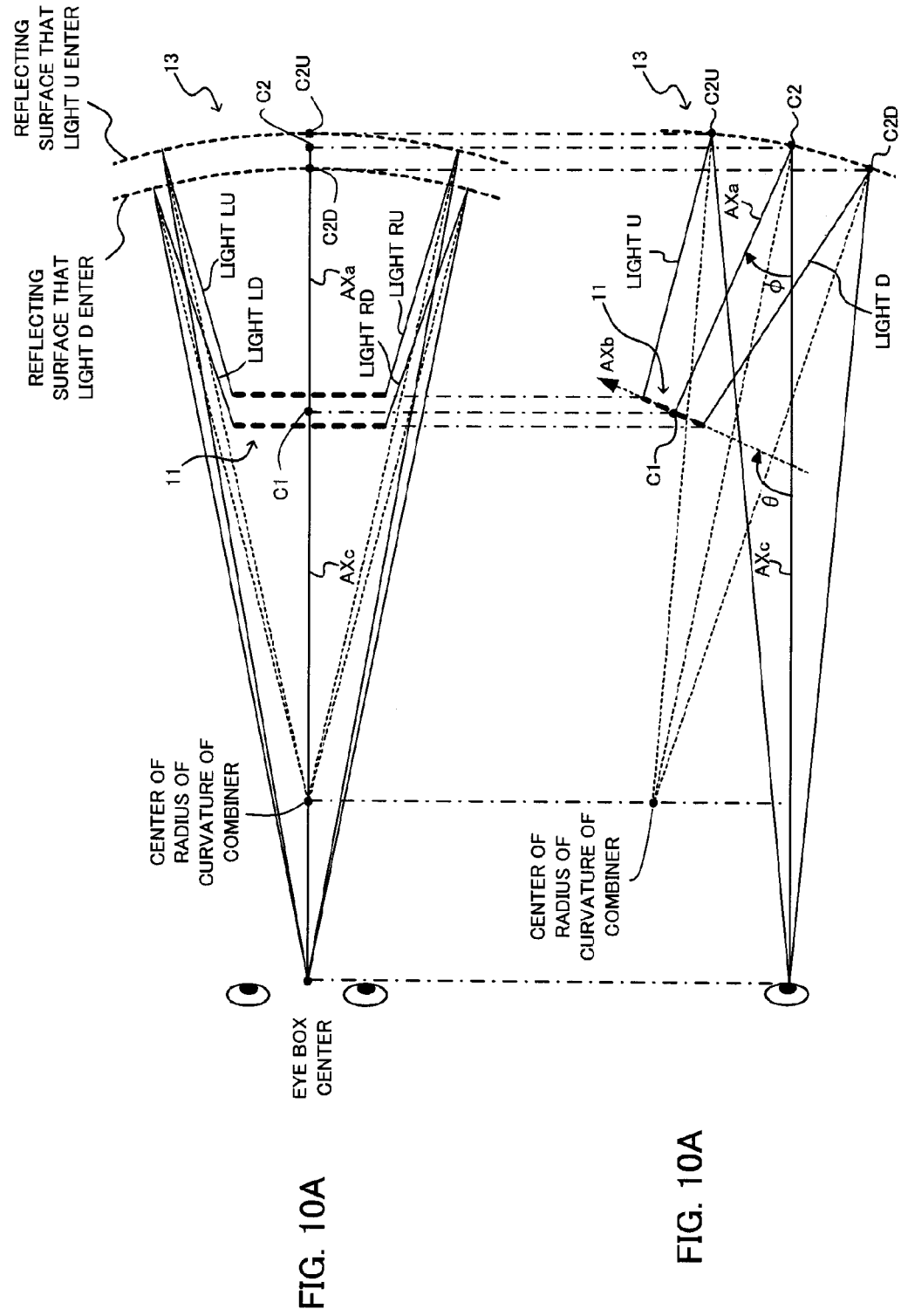

VIRTUAL IMAGE DISPLAY DEVICE

TECHNICAL FIELD

The present invention relates to a virtual image display device which makes a user view an image as a virtual image.

BACKGROUND TECHNIQUE

Conventionally, there is known a display device, such as a head-up display, which makes a user view an image as a virtual image from a position (eye point) of eyes of the user. For example, Patent Reference 1 proposes a technique of providing two concave mirrors for magnifying the image on a light path from an image displaying device to an observer to form a virtual image by reflecting the image of the image display device twice, thereby improving a magnification ratio of the virtual image and geometric distortion of the virtual image. Also, for example, Patent Reference 2 proposes a visual display device which includes: a projection optical system including at least one rotation-asymmetrical correction optical surface for correcting image distortion, wherein a display surface of an image display element and a projection surface of the projection optical system are eccentric in a Y-Z sectional surface and the projection surface is formed by an arc-like curved surface whose bowstring is directed to the projection optical system side in the X-Z sectional surface; and an ocular optical system having a positive reflection power making a distant virtual image from the projected image.

Further, technique relevant to the present invention is proposed in Patent Reference 3, for example.

PRECEDING TECHNICAL DOCUMENTS

Patent References

Patent Reference 1: Japanese Patent Application Laid-open under No. H08-29723
Patent Reference 2: Japanese Patent Application Laid-open under No. 2010-164944
Patent Reference 3: Japanese Patent Application Laid-open under No. 2009-150947

DISCLOSURE OF INVENTION

Problem to be Solved by the Invention

By the way, in a head-up display as described above, if a concave surface mirror having small radius of curvature is used in a tilted manner in order to obtain a large angle of view, for example, the image tends to be distorted. Also, the distortion of different shape tends to occur to the virtual images observed by the left and right eyes. This can make a user tired. The configuration of using two reflecting surfaces described in Patent Reference 1 can reduce the distortion of the virtual image, but this configuration makes the entire head-up display large and it is disadvantageous in view of attachment to a vehicle compartment. Using the optical element of aspheric surface or free-form surface as described in Patent Reference 2 can minimize the distortion of the virtual image, but it is known that such an optical element is difficult to manufacture with low cost.

The above is an example of a problem to be solved by the present invention. It is an object of the present invention to provide a display device capable of appropriately suppressing the distortion of the virtual image with simple configuration.

Means for Solving the Problem

In one invention, a virtual image display device includes: an image forming element which forms an image to be displayed; and an optical element which reflects a light emitted from the image forming element to display a virtual image, wherein the optical element has a concave shape opposite to a traveling direction of the light emitted from the image forming element, wherein the light emitted from the image forming element enters the optical element without being reflected by other optical element, and wherein the image forming element is arranged in a direction substantially orthogonal to a direction of viewing the virtual image through the optical element.

In another invention, a virtual image display device includes: an image forming element which forms an image to be displayed; and an optical element which reflects, by its concave surface, a light emitted from the image forming element to display a virtual image, wherein the optical element is arranged in an emitting direction of the light emitted from the image forming element, and wherein the image forming element is arranged in a direction substantially orthogonal to a direction of viewing the virtual image through the optical element.

In still another invention, a virtual image display device displays a virtual image by reflecting a light emitted from an image forming element which forms an image to be displayed, by an optical element which includes a concave surface arranged in an emitting direction of the light emitted from the image forming element, wherein the image forming element is arranged in a direction substantially orthogonal to a direction of viewing the virtual image through the optical element.

BRIEF DESCRIPTION OF THE DRAWINGS

FIGS. 10A and 10B are diagrams for explaining that distortion of the virtual image occurs when the EPE is not arranged in a direction orthogonal to the visual line direction.
FIGS. 11A and 11B are diagrams for explaining that distortion of the virtual image can be suppressed when the EPE is arranged in a direction orthogonal to the visual line direction.

Forms to Exercise the Invention

Figure 1:
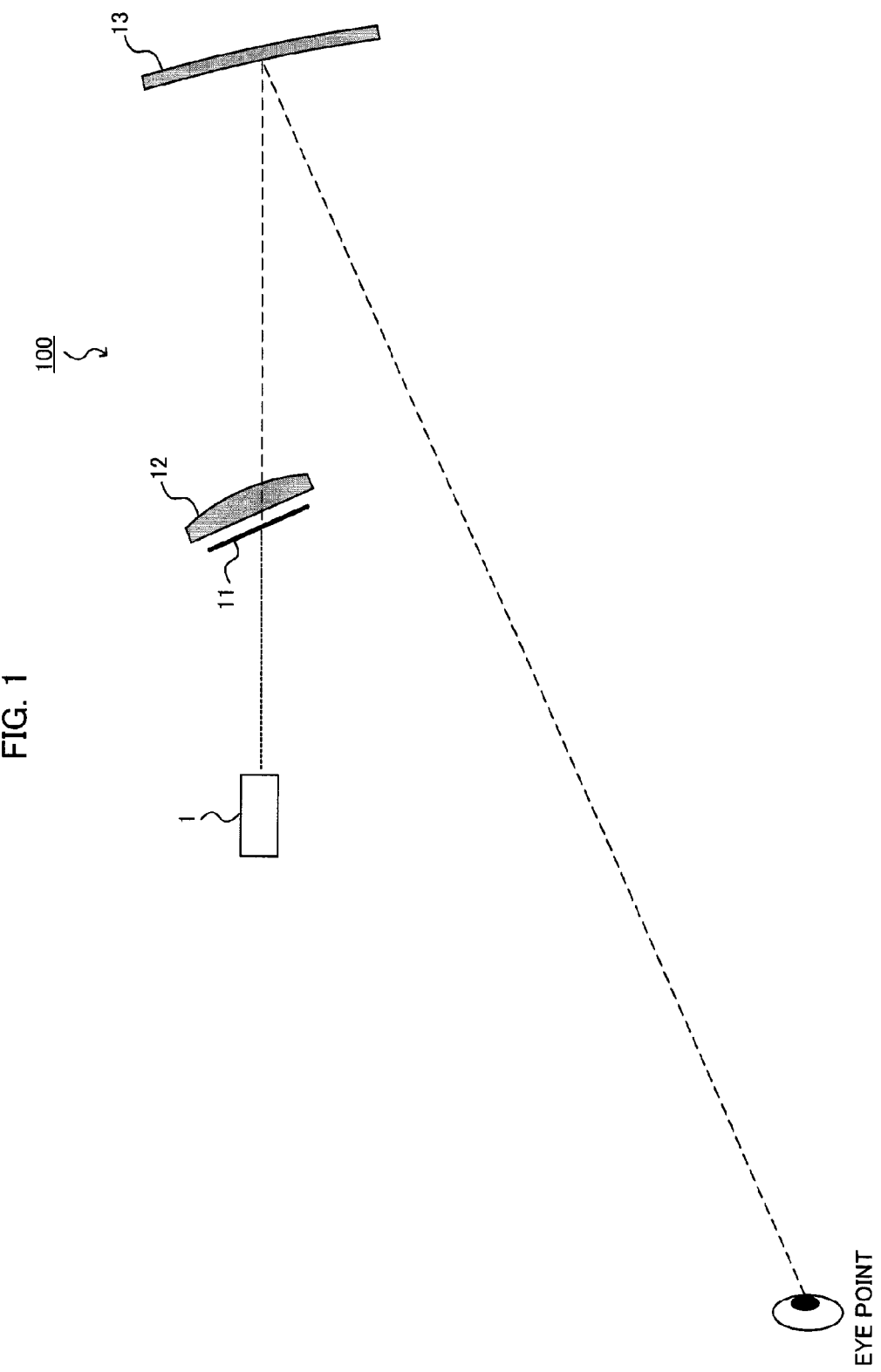
FIG. 1 shows an entire configuration of a display device according to a first embodiment.

According to one aspect of the present invention, there is provided a virtual image display device including: an image forming element which forms an image to be displayed; and an optical element which reflects a light emitted from the image forming element to display a virtual image, wherein the optical element has a concave shape opposite to a traveling direction of the light emitted from the image forming element, wherein the light emitted from the image forming element enters the optical element without being reflected by other optical element, and wherein the image forming element is arranged in a direction substantially orthogonal to a direction of viewing the virtual image through the optical element.

The above virtual image display device makes a user view an image as a virtual image. The image forming element forms an image to be displayed, and the optical element reflects the light emitted from the image forming element to display the virtual image. The optical element has a concave shape opposite to a traveling direction of the light emitted from the image forming element, and the light emitted from the image forming element enters the optical element without being reflected by other optical element (e.g., mirror). Preferably, the optical element is arranged in an emitting direction of the light emitted from the image forming element. The image forming element is arranged in a direction substantially orthogonal to a direction of viewing the virtual image through the optical element. Namely, the surface of the image forming element from which the light is emitted is arranged in a direction substantially orthogonal to the direction of viewing the virtual image.

According to the above virtual image display device, the distortion of the virtual image can be appropriately suppressed. Specifically, it is possible to appropriately suppress the trapezoidal distortion of the virtual image, the difference of the aspect ratio between the image formed on the image forming element and the virtual image, and/or the difference between the shapes of the virtual images observed by the respective eyes. In addition, by suppressing the difference between the shapes of the virtual images observed by both eyes, it becomes easy to correct the distortion of the virtual image by an image processing.

One mode of the above virtual image display device further includes an angle changing unit which changes an angle of the image forming element such that the image forming element is arranged in the direction substantially orthogonal to the direction of viewing the virtual image. By this, when the tilt of the optical element is changed, by appropriately changing the tilt of the image forming element, it is possible to appropriately suppress the distortion of the virtual image caused by the fact that the image forming element and the direction of viewing the virtual image are not orthogonal to each other.

Another mode of the above virtual image display device further includes a virtual image distortion correcting element arranged between the image forming element and the optical element. In this case, preferably, the virtual image distortion correcting element corrects arch-shape distortion of the virtual image caused by a curvature of the optical element. By using the virtual image distortion correcting element, it is possible to appropriately correct the arch-shape distortion of the virtual image.

In still another mode of the above virtual image display device, the light emitted from the image forming element may directly enter the optical element. By this, the device configuration can be simplified.

In still another mode of the above virtual image display device, the image forming element is an exit-pupil expanding element which expands an exit-pupil of the light irradiated from a light source. For example, the exit-pupil expanding element is a microlens array in which plural microlenses are arranged.

Still another mode of the above virtual image display device further includes a correcting unit which corrects distortion of the image formed on the image forming element by the light irradiated from the light source. Preferably, the correcting unit corrects the distortion of the image caused by an angle of the light irradiated from the light source with respect to the image forming element. By this, it is possible to appropriately correct the distortion of the image caused by the fact that the light irradiated from the light source does not perpendicularly enter the image forming element, for example.

In still another mode of the above virtual image display device, a liquid crystal display or an organic EL display may be used as the image forming element.

Preferably, the image forming element may be arranged at a position where the light reflected by the optical element is not irradiated.

Preferably, the image forming element may have a plane shape.

According to another aspect of the present invention, there is provided a virtual image display device including: an image forming element which forms an image to be displayed; and an optical element which reflects, by its concave surface, a light emitted from the image forming element to display a virtual image, wherein the optical element is arranged in an emitting direction of the light emitted from the image forming element, and wherein the image forming element is arranged in a direction substantially orthogonal to a direction of viewing the virtual image through the optical element.

According to still another aspect of the present invention, there is provided a virtual image display device which displays a virtual image by reflecting a light emitted from an image forming element which forms an image to be displayed, by an optical element which includes a concave surface arranged in an emitting direction of the light emitted from the image forming element, wherein the image forming element is arranged in a direction substantially orthogonal to a direction of viewing the virtual image through the optical element.

Embodiments

Preferred embodiments of the present invention will be described below with reference to the attached drawings.

[1st Embodiment]

A first embodiment of the present invention will be described.

(Device Configuration)

FIG. 1 is a block diagram schematically showing an entire configuration of a virtual image display device 100 according to a first embodiment. Here, the outline of each constitutional element of the virtual image display device 100 will be described.

As shown in FIG. 1, the virtual image display device 100 according to the first embodiment mainly includes a laser projector 1, an EPE (Exit-Pupil Expander) 11, a field lens 12 and a combiner 13. The virtual image display device 100 makes a user view an image from the position of the eye of the user (eye point) as a virtual image. The virtual image display device 100 is used as a head-up display or a head-mount display, for example.

The laser projector 1 includes red, green and blue laser light sources, a scan mechanism for scanning the laser lights emitted by the laser light sources, and a control unit for controlling them. The light irradiated by the laser projector 1 enters the EPE 11. The detail of the laser projector 1 will be described later.

The EPE 11 magnifies the exit pupil of the light irradiated by the laser projector 1 and forms an intermediate image of the image to be presented to the user. For example, the EPE 11 is a microlens array in which plural microlenses are arranged. The light emitted by the EPE 11 enters the field lens 12. At the EPE 11, the image without distortion is formed as the intermediate image. The EPE 11 corresponds to an example of "an image forming element" in the present invention.

The field lens 12 is a lens arranged on the exit side of the EPE 11. The field lens 12 has a flat shape on the surface (i.e., the incident surface) to which the light from the EPE 11 enters, and has a spherical convex shape on the surface (i.e., the exit surface) opposite to the surface to which the light from the EPE 11 enters. The field lens 12 is arranged with a space from the EPE 11 such that the surface of the flat shape becomes parallel with the surface of the EPE 11. Also, the field lens 12 is arranged such that the axis connecting its center and the center of the EPE 11 becomes parallel with the axis extending in the vertical direction of the EPE 11. The light emitted by the field lens 12 enters the combiner 13. The field lens 12 corresponds to an example of "a virtual image distortion correcting element" in the present invention.

The combiner 13 is a half mirror which reflects the light from the field lens 12 thereby to display the image corresponding to the incident light as a magnified virtual image. Specifically, the combiner 13 has a surface (i.e., the incident surface), to which the light from the field lens 12 is incident, formed in a spherical concave surface shape. By the light reflected by the combiner 13, the user observes the virtual image from the eye point which is a predetermined distance apart from the combiner 13. The combiner 13 corresponds to one example of "an optical element" in the present invention.

For example, the EPE 11 and the field lens 12 are configured integrally with the laser projector 1. Namely, in the virtual image display device 100, the laser projector 1, the EPE 11 and the field lens 12 are not formed as separate parts, but the laser projector 1, the EPE 11 and the field lens 12 are formed as a single unit.

Figure 2:
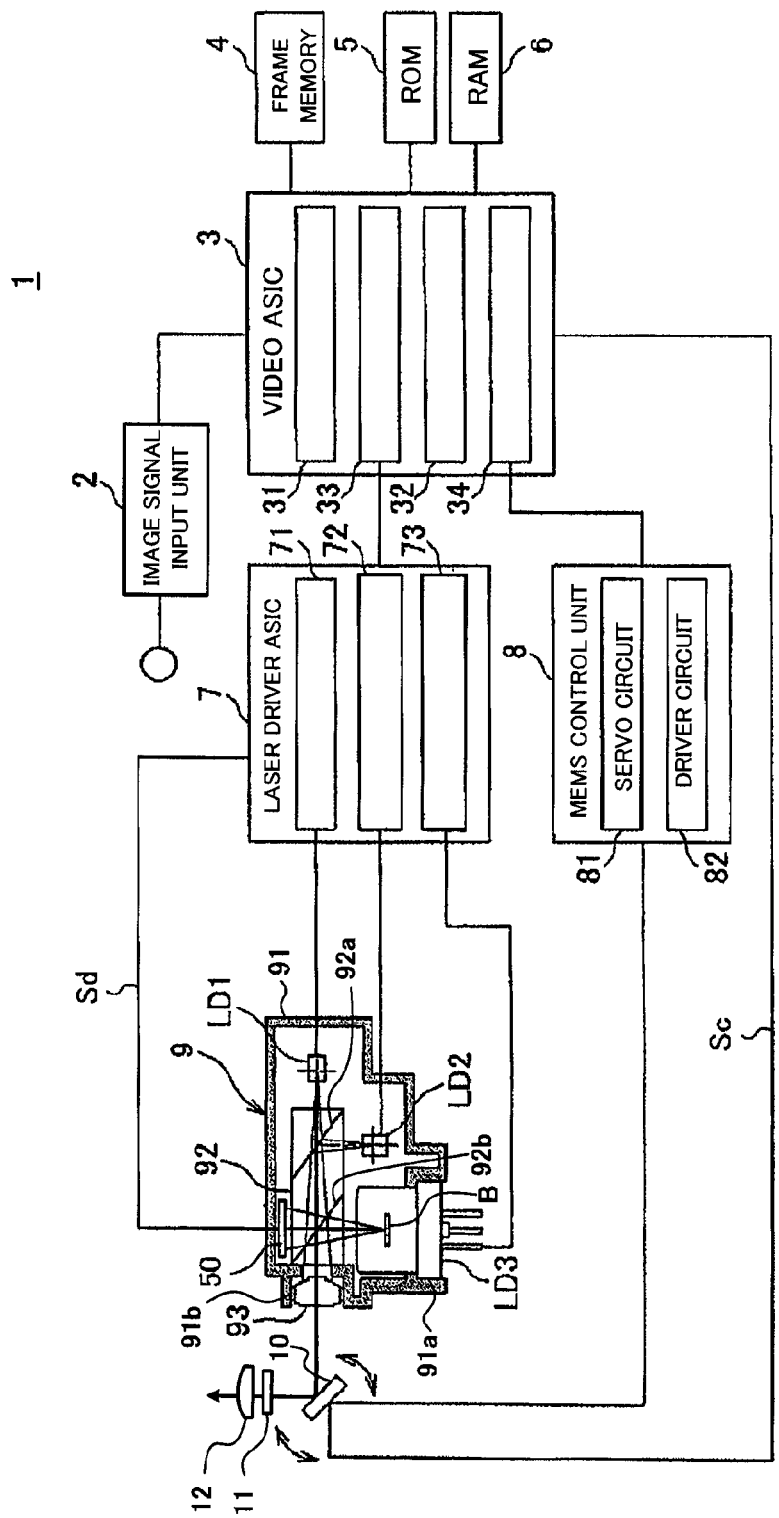
FIG. 2 shows a configuration of a laser projector.

Next, with reference to FIG. 2, the configuration of the laser projector 1 will be described. As shown in FIG. 2, the laser projector 1 includes an image signal input unit 2, a video ASIC 3, a frame memory 4, a ROM 5, a RAM 6, a laser driver ASIC 7, a MEMS control unit 8, a laser light source unit 9 and a MEMS mirror 10.

The image signal input unit 2 receives an image signal inputted from outside and outputs it to the video ASIC 3. The video ASIC 3 is a block which controls the laser driver ASIC 7 and the MEMS control unit 8 based on the image signal inputted from the image signal input unit 2 and the scanning position information Sc inputted from the MEMS mirror 10. The video ASIC 3 is configured as an ASIC (Application Specific Integrated Circuit).

The video ASIC 3 includes a sync/image separating unit 31, a bit data converting unit 32, an emission pattern converting unit 33 and a timing controller 34. The sync/image separating unit 31 separates the image data to be displayed on the EPE 11 serving as an image displaying unit and the synchronization signal from the image signal inputted from the image signal input unit 2, and writes the image data into the frame memory 4. The bit data converting unit 32 reads out the image data written in the frame memory 4 and converts it to the bit data. The emission pattern converting unit 33 converts the bit data converted by the bit data converting unit 32 to the signal indicating the emission pattern of each of the lasers. The timing controller 34 controls the operation timings of the sync/image separating unit 31 and the bit data converting unit 32. The timing controller 34 also controls the operation timing of the MEMS control unit 8 described later.

Into the frame memory 4, the image data separated by the sync/image separating unit 31 is written. The ROM 5 stores control program and data necessary for the operation of the video ASIC 3. The RAM 6 serves as a work memory for the operation of the video ASIC, and various data is sequentially written into and read from the RAM 6.

The laser driver ASIC 7 is a block for generating signals to drive the laser diodes provided in the laser light source unit 9 described later, and is configured as an ASIC. The laser driver ASIC 7 includes a red laser driving circuit 71, a blue laser driving circuit 72 and a green laser driving circuit 73. The red laser driving circuit 71 drives the red laser LD1 based on the signal outputted by the emission pattern converting unit 33. The blue laser driving circuit 72 drives the blue laser LD2 based on the signal outputted by the emission pattern converting unit 33. The green laser driving circuit 73 drives the green laser LD3 based on the signal outputted by the emission pattern converting unit 33.

The MEMS control unit 8 controls the MEMS mirror 10 based on the signal outputted by the timing controller 34. The MEMS control unit 8 includes a servo circuit 81 and a driver circuit 82. The servo circuit 81 controls the operation of the MEMS mirror 10 based on the signal from the timing controller 34. The driver circuit 82 amplifies the control signal of the MEMS mirror 10 outputted by the servo circuit 81 to a predetermined level and outputs it.

The laser light source unit 9 emits the laser light to the MEMS mirror 10 based on the driving signal outputted by the laser driver ASIC 7. The MEMS mirror 10 serving as a scanning means reflects the laser light emitted by the laser light source unit 9 to the EPE 11. By this, the MEMS mirror 10 forms the image to be displayed on the EPE 11. Also, the MEMS mirror 10 moves to scan the EPE 11 under the control of the MEMS control unit 8 so as to display the image inputted to the image signal input unit 2, and outputs the scanning position information (e.g., information such as the angle of the mirror) to the video ASIC 3.

Next, the detailed configuration of the laser light source unit 9 will be described. The laser light source unit 9 includes a casing 91, a wavelength selective element 92, a collimator lens 93, a red laser LD1, a blue laser LD2, a green laser LD3 and a monitoring-purpose light receiving element (hereinafter simply referred to as "light receiving element") 50. In the following description, the red laser LD1, the blue lase LD2 and the green laser LD3 are simply expressed as "the laser LD" when they are not distinguished from each other.

The casing 91 is formed of resin into a substantially box shape. The casing 91 is formed with a CAN attaching part 91a and a collimator attaching part 91b. In order to attach the green laser LD3, the CAN attaching part 91a has a concave sectional shape and formed with a hole communicating with the inside of the casing 91. The collimator attaching part 91b is provided on a surface perpendicular to the CAN attaching part 91a, has a concave sectional shape, and is formed with a hole communicating with the inside of the casing 91.

The wavelength selective element 92 serving as a synthesizing element is configured by a trichroic prism, for example, and is formed with a reflecting surfaces 92a and 92b. The reflecting surface 92a transmits the laser light emitted by the red laser LD1 to the collimator lens 93, and reflects the laser light emitted by the blue laser LD2 to the collimator lens 93. The reflecting surface 92b transmits a major part of the laser light emitted by the red laser LD1 and the blue laser LD2 to the collimator lens 93, and reflects a part of those laser lights to the light receiving element 50. In addition, the reflecting surface 92b reflects a major part of the laser light emitted by the green laser LD3 to the collimator lens 93, and transmits a part of the same laser light to the light receiving element 50. Thus, the lights emitted by those lasers are overlapped and incident upon the collimator lens 93 and the light receiving element 50. The wavelength selective element 92 is provided adjacent to the collimator attaching part 91b in the casing 91. The collimator lens 93 outputs the laser light incident from the wavelength selective element 92 to the MEMS mirror 10 as a parallel light. The collimator lens 93 is fixed to the collimator attaching part 91b of the casing 91 by UV adhesive. Namely, the collimator lens 93 is provided behind the synthesizing element.

The red laser LD1 serving as a laser light source emits the red laser light. The red laser LD1 is fixed at a position on the same axis as the wavelength selective element 92 in the casing 91 and the collimator lens 93, in such a manner that the semiconductor laser light source is in the chip state or the chip is disposed on a sub-mount. The blue laser LD2 serving as a laser light source emits the blue laser light. The blue laser LD2 is fixed at a position that enables the emitted laser light to be reflected by the reflecting surface 92a to the collimator lens 93, in such a manner that the semiconductor laser light source is in the chip state or the chip is disposed on a sub-mount. The positions of the red laser LD1 and the blue laser LD2 maybe exchanged. The green laser LD3 serving as a laser light source is in a state being attached to the CAN package or the frame package, and emits the green laser light. A semiconductor laser light source chip B emitting the green laser light is attached in the CAN package of the green laser LD3, and the green laser LD3 is fixed at the CAN attaching part 91a of the casing 91. The light receiving element 50 receives a part of the laser light emitted by each of the laser light sources. The light receiving element 50 is a photoelectric converting element such as a photo-detector, and supplies a detection signal Sd, which is an electric signal in accordance with the light quantity of the incident laser light, to the laser driver ASIC 7.

(Angle of EPE with Respect to Visual Line Direction)

Next, with reference to FIGS. 3, 4A and 4B, the description will be given of the angle of the EPE 11 with respect to the direction in which the user gazes the center of the visual image from the front (hereinafter referred to as "the visual line direction"). Here, for convenience, the description will be made for the optical system without the field lens 12.

Figure 3:
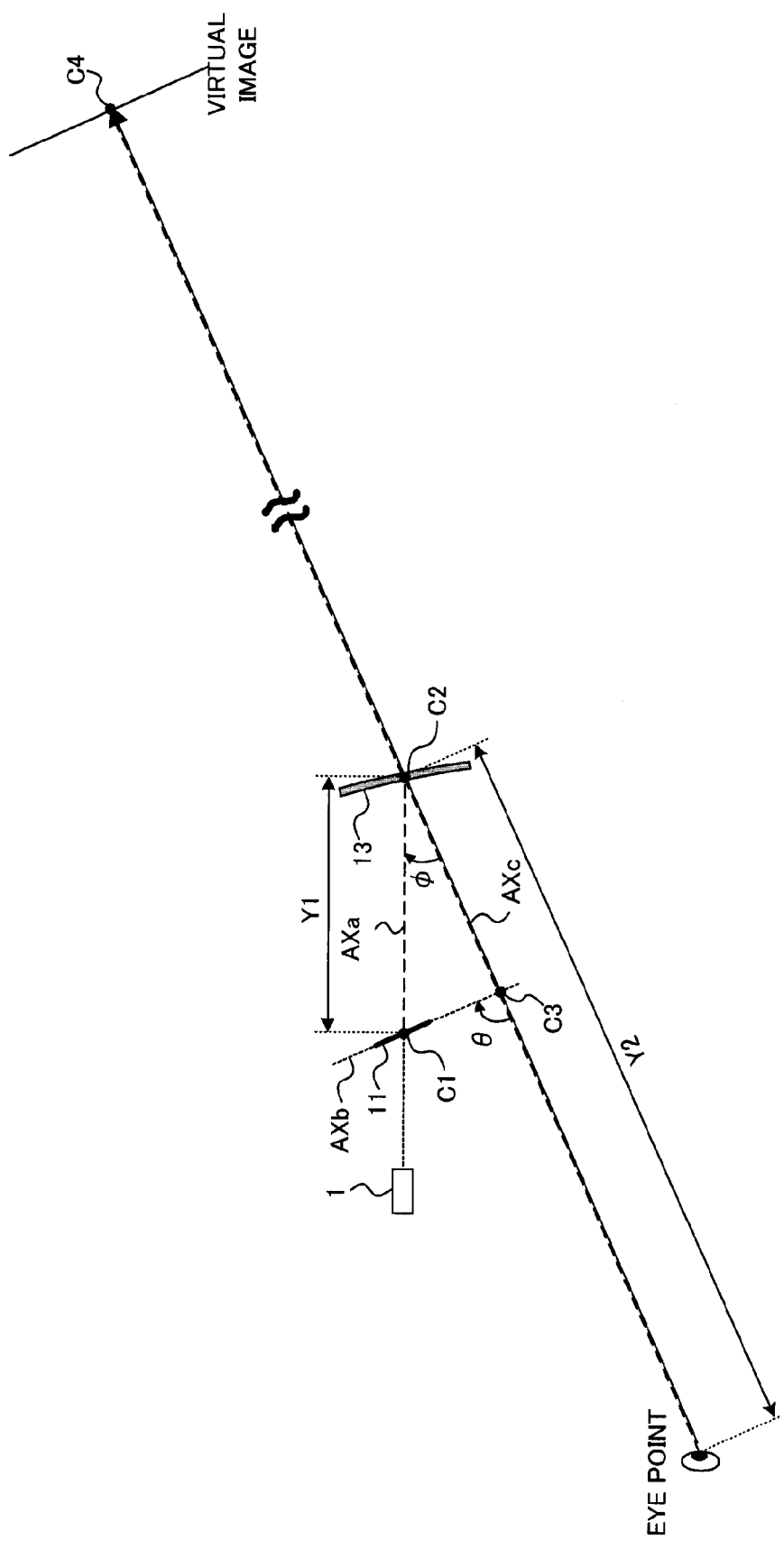
FIG. 3 is a diagram for explaining a direction (a visual line direction) to gaze a center of the virtual image from the eye point.

FIG. 3 is a diagram for explaining the visual line direction. As shown in FIG. 3, the visual line direction is defined as the direction in which the user gazes the center C4 of the virtual image from the front. The axis corresponding to the visual line direction is defined as "AXc".

Figure 4A:
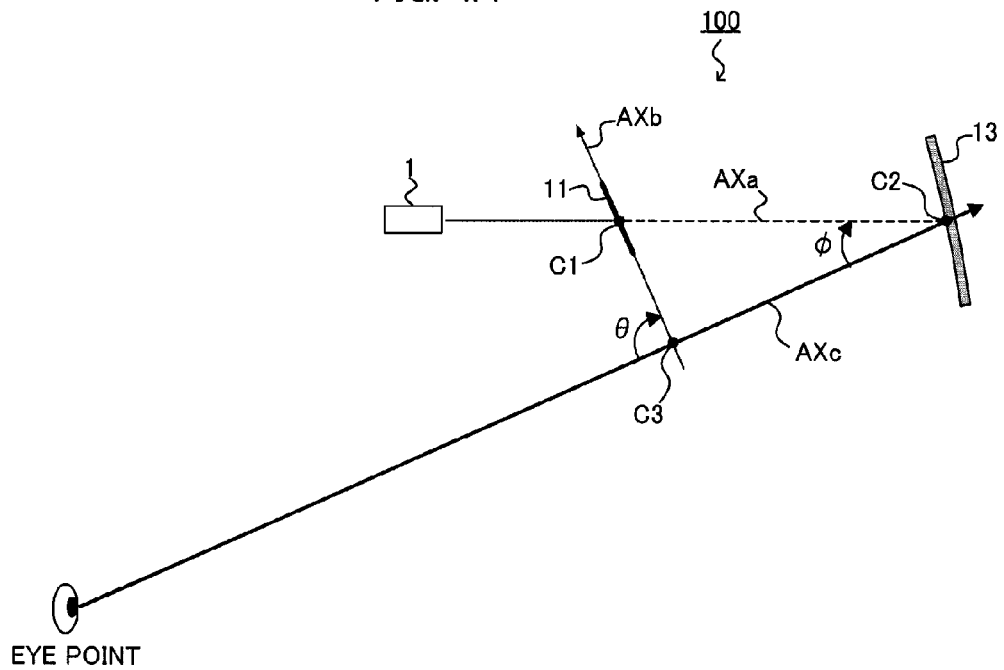
FIGS. 4A and 4B are diagrams for explaining an arrangement relation of an EPE and a combiner with respect to the visual line direction.
Figure 4B:
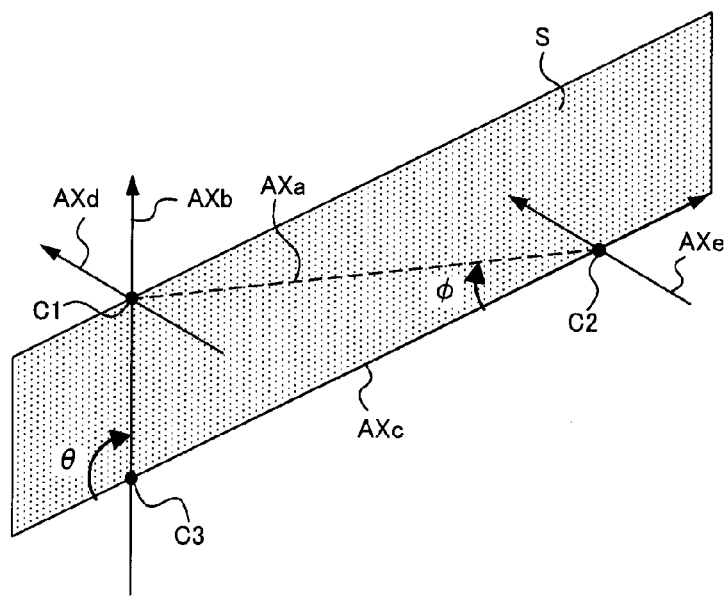

FIGS. 4A and 4B are diagrams for explaining the arrangement relationship between the EPE 11 and the combiner 13 with respect to the visual line direction. As shown in FIG. 4A, the straight line connecting the center CA of the EPE 11 and the center C2 of the combiner 13 is defined as "AXa", and the axis passing through the center C1 of the EPE 11 and parallel with the surface of the EPE 11 is defined as "AXb". Thus, the angle between the straight line AXa and the axis AXc is defined as "$\phi$", and the angle between the axis AXb and the axis AXc is defined as "$\theta$". In this specification, the angle "$\theta$" is referred to as "the angle of the EPE 11 with respect to the visual line direction". It is noted that the clockwise direction observed from the axis AXc is positive for the angle $\phi$, and the clockwise direction observed from the axis AXc is positive for the angle $\theta$.

The description will be further given with reference to FIG. 4B. In FIG. 4B, the hatched area S is a part of the section of the optical system shown in FIG. 4A. As shown in FIG. 4B, an axis which perpendicularly crosses the straight line AXa and passes through the center C1 of the EPE 11 is defined as "AXd", and an axis which perpendicularly crosses the straight line AXa and passes through the center C2 of the combiner 13 is defined as "AXe". The axis AXb is defined as an axis which is orthogonal to the axis AXd and which passes through the center C1 of the EPE 11. If the surface of the EPE 11 is tilted around the axis AXd, the axis AXb rotates accordingly. The light incident on the center C2 of the combiner 13 from the center C1 of the EPE 11 is reflected in the direction of the axis AXc determined in accordance with the tilt angle of the combiner 13 around the axis AXe. The opposite direction of the reflected light corresponds to the visual line direction when the user sees the center C4 of the virtual image from the front. Here, the angle between the straight line AXa and the axis AXc is "$\phi$", and the angle between the axis AXc and the axis AXB is "$\theta$". The intersection of the axis AXc and the axis AXb is expressed as "C3".

In this embodiment, in view of suppressing the distortion of the virtual image displayed by the combiner 13 (e.g., in view of suppressing the difference in shapes between the virtual images observed by the left and right eyes), the EPE 11 is arranged in the direction substantially orthogonal to the direction in which the user sees the virtual image through the combiner 13 (the virtual line direction). Namely, the angle $\theta$ of the EPE 11 with respect to the visual line direction (i.e., the angle $\theta$ between the axis AXc and the axis AXb) is set to substantially 90 degrees.

(Simulation Results)

Next, the description will be given of the simulation results when the angle θ of the EPE 11 with respect to the visual line direction is set to substantially 90 degrees.

The following simulation results are obtained by the simulation performed using the following parameters. As to "Y1" and "Y2", reference should be made to FIG. 3.

Figure 5:
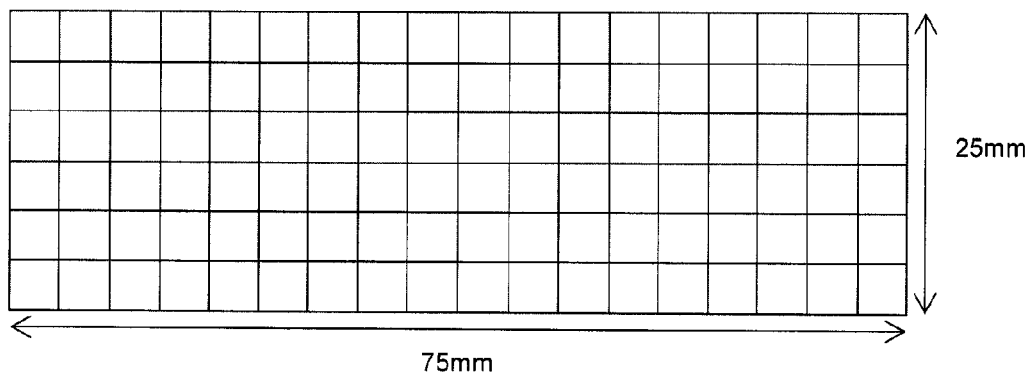
FIG. 5 shows an image formed on the EPE in a simulation.

Angle φ between the light which enters the center C2 of the combiner 13 from the center C1 of the EPE 11 and the reflected light (the angle between the straight line AXa and the axis AXc): 24 degrees Interval Y1 between the center C1 of the EPE 11 and the center C2 of the combiner 13 (distance measured along the straight line AXa): 170 mm Interval Y2 between the center C2 of the combiner 13 and the eye point: 500 mm Size of the intermediate image formed on the EPE 11: Horizontal length 75 mm×Vertical length 25 mm (The shape of the intermediate image is the lattice image as shown in FIG. 5, in which squares with no distortion are aligned)

Radius of curvature of the concave surface of the combiner 13: 400 mm

Radius of curvature of the convex surface of the field lens 12: 150 mm

Center thickness of the field lens 12: 8 mm

Interval between the EPE 11 and the surface of the field lens 12: 2 mm

Refractive index of the field lens 12: 1.526

Figure 6:
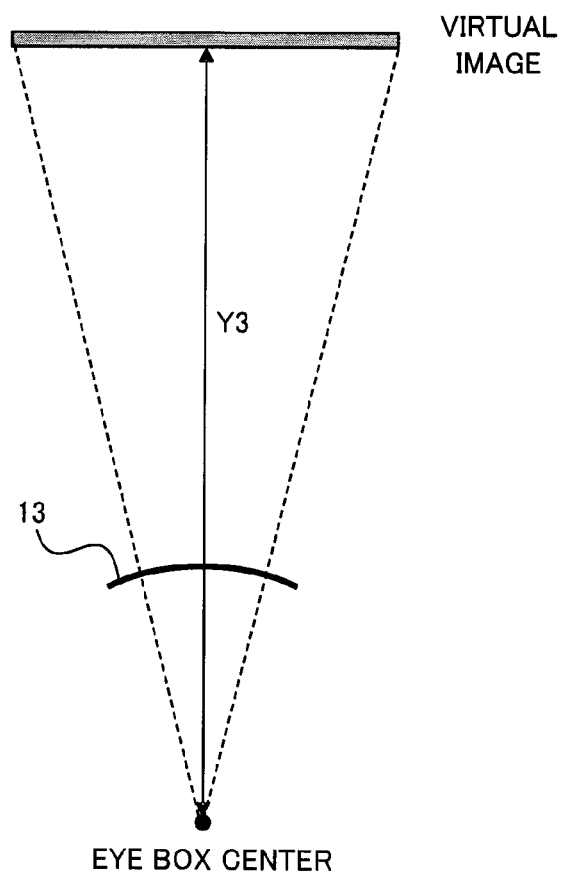
FIG. 6 is a diagram for explaining a simulation condition at the eye box center.

First, with reference to FIGS. 6, 7A to 7C, the simulation results at the eye box center will be described. Here, the description will be given of the case where the virtual image is formed at the position "Y3=1500 mm" ahead of the eye box center as shown in FIG. 6. Here, the eye box center indicates an ideal observing point which locates substantially at the center of both eyes and from which the virtual image can be observed substantially right in front.

Figure 7A:
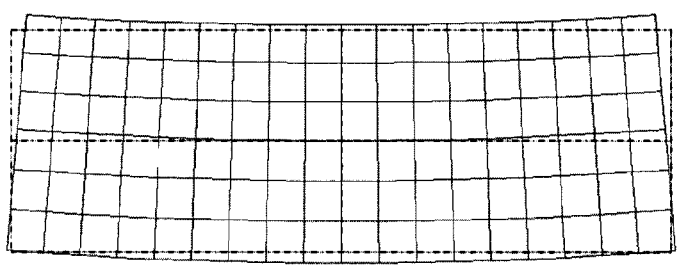
FIGS. 7A to 7C show examples of simulation result at the eye box center in the first embodiment.
Figure 7B:
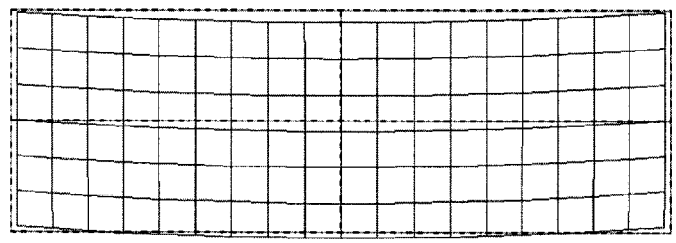
Figure 7C:
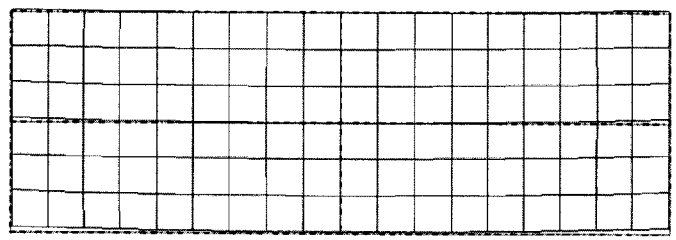

FIGS. 7A to 7C show examples of the simulation result at the eye box center. In FIGS. 7A to 7C, the virtual image obtained by the simulation is shown by the solid lines, and the shape of the reference screen for comparing the virtual image size and the shape is shown by the dashed line. Here, the size of the reference screen is "Horizontal length 450 (mm)×Vertical length 150 (mm)".

FIGS. 7A to 7C show examples of the simulation result at the eye box center. In FIGS. 7A to 7C, the virtual image obtained by the simulation is shown by the solid lines, and the shape of the reference screen for comparing the virtual image size and the shape is shown by the dashed line. Here, the size of the reference screen is "Horizontal length 450 (mm)×Vertical length 150 (mm)".

FIG. 7A shows an example of the simulation result in a case where the angle θ of the EPE 11 with respect to the visual line direction is set to "114 degrees", i.e., the EPE 11 is not arranged in the direction substantially orthogonal to the visual line direction. Also, FIG. 7A shows the example of the simulation result in a case where the field lens 12 is not arranged between the EPE 11 and the combiner 13. From FIG. 7A, it is understood that the virtual image has distortion. Specifically, it is understood that trapezoidal distortion of the virtual image and arch-shape distortion of the virtual image occur.

FIG. 7B shows an example of the simulation result in a case where the angle θ of the EPE 11 with respect to the visual line direction is set to "90 degrees", i.e., the EPE 11 is arranged in the direction substantially orthogonal to the visual line direction. Also, FIG. 7B shows the example of the simulation result in a case where the field lens 12 is not arranged between the EPE 11 and the combiner 13. From FIG. 7B, it is understood in comparison with FIG. 7A that the trapezoidal distortion of the virtual image is appropriately eliminated.

FIG. 7C shows an example of the simulation result in a case where the angle θ of the EPE 11 with respect to the visual line direction is set to "90 degrees", i.e., the EPE 11 is arranged in the direction substantially orthogonal to the visual line direction. Also, FIG. 7B shows the example of the simulation result in a case where the field lens 12 is arranged between the EPE 11 and the combiner 13. From FIG. 7C, it is understood in comparison with FIG. 7B that the arch-shape distortion of the virtual image is appropriately eliminated.

Figure 8:
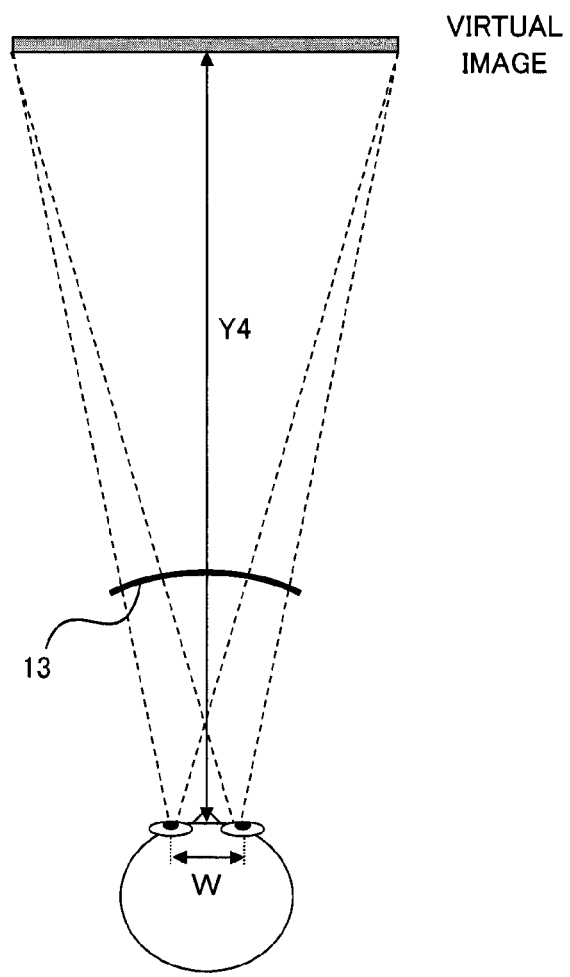
FIG. 8 is a diagram for explaining a simulation condition with both eyes in the first embodiment.

Next, with reference to FIGS. 8, 9A to 9C, the description will be given of the simulation result with both eyes. Here, as shown in FIG. 8, the interval W between both eyes is "70 mm", and the virtual image is formed at the position "Y4=1500 mm" ahead of the center position of the left eye and the right eye.

Figure 9A:
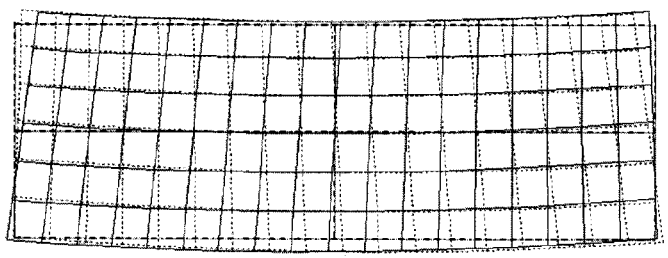
FIGS. 9A to 9C show examples of the simulation result with both eyes in the first embodiment.
Figure 9B:
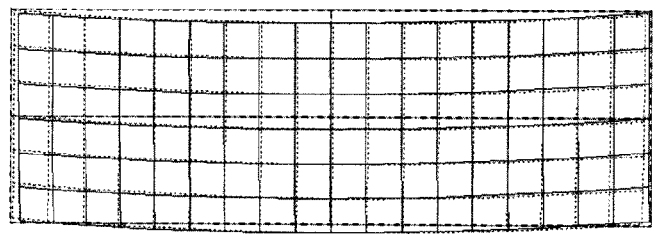
Figure 9C:
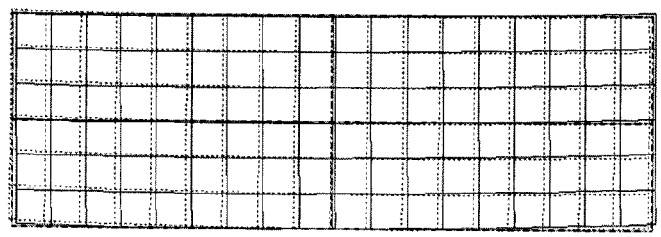

FIGS. 9 to 9C show examples of the simulation result with both eyes. In FIGS. 9A to 9C, the virtual image obtained by the simulation is shown by the solid lines and the broken line, and the shape of the reference screen is shown by the dashed line. Specifically, the virtual image observed by the left eye is shown by the solid line, and the virtual image observed by the right eye is shown by the broken line.

FIG. 9A shows an example of the simulation result in a case where the angle θ of the EPE 11 with respect to the visual line direction is set to "114 degrees", i.e., the EPE 11 is not arranged in the direction substantially orthogonal to the visual line direction. Also, FIG. 9A shows the example of the simulation result in a case where the field lens 12 is not arranged between the EPE 11 and the combiner 13. From FIG. 9A, it is understood that distortion of the virtual image such as trapezoidal distortion and arch-shape distortion occur. In addition, it is understood that the shape of the distortion of the virtual image observed by the left eye is different from the shape of the distortion of the virtual image observed by the right eye.

FIG. 9B shows an example of the simulation result in a case where the angle θ of the EPE 11 with respect to the visual line direction is set to "90 degrees", i.e., the EPE 11 is arranged in the direction substantially orthogonal to the visual line direction. Also, FIG. 9B shows the example of the simulation result in a case where the field lens 12 is not arranged between the EPE 11 and the combiner 13. From FIG. 9B, it is understood in comparison with FIG. 9A that the trapezoidal distortion of the virtual image is appropriately eliminated. In addition, the difference of the shapes of the virtual images observed by the left and right eyes is appropriately eliminated.

FIG. 9C shows an example of the simulation result in a case where the angle θ of the EPE 11 with respect to the visual line direction is set to "90 degrees", i.e., the EPE 11 is arranged in the direction substantially orthogonal to the visual line direction. Also, FIG. 9B shows the example of the simulation result in a case where the field lens 12 is arranged between the EPE 11 and the combiner 13. From FIG. 9C, it is understood in comparison with FIG. 9B that the arch-shape distortion of the virtual image is appropriately eliminated. In addition, it is understood that the state, in which the difference of the shapes of the virtual images observed by both eyes as shown in FIG. 9B is suppressed, is appropriately maintained.

From above, according to the first embodiment, the distortion of the virtual image can be appropriately suppressed by arranging the EPE 11 in the direction substantially orthogonal to the visual line direction. Specifically, the trapezoidal distortion of the virtual image and the difference of the shapes of the virtual images observed by both eyes can be appropriately suppressed. Further, by inserting the field lens 12 on the exit side of the EPE 11, the arch-shape distortion of the virtual image can be appropriately suppressed.

Here, with reference to FIGS. 10 and 11, the description will be given of the reason why the distortion of the virtual image can be suppressed by arranging the EPE 11 in the direction substantially orthogonal to the visual line direction. Here, for convenience in explanation, the description will be given by using the optical system without the field lens 12. In the following description, the optical system including at least the EPE 11 and the combiner 13 will be referred to as "an ocular optical system".

FIGS. 10A and 10B are diagrams showing the case where the EPE 11 is not arranged in the direction orthogonal to the visual line direction (i.e., the angle θ between the axis AXc and the axis AXb is not 90 degrees). FIG. 10A corresponds to a top view of the ocular optical system, and FIG. 10B corresponds to a side view of the ocular optical system. Specifically, FIG. 10B corresponds to the diagram in which the ocular optical system shown in FIG. 3 is rotated in the clockwise direction by the angle φ.

Since the reflection surface of the combiner 13 has a spherical concave shape, a normal direction at a certain point on the reflection surface is directed to the center of the radius of curvature of the combiner 13. In FIGS. 10A and 10B, the normal vector at each point on the reflection surface is expressed by the broken line connecting the reflection surface of the combiner 13 and the center of the radius of curvature of the combiner 13 (It also applies to FIGS. 11A and 11B). The lights incident on the combiner 13 are reflected symmetrically with respect to the normal direction. FIG. 10B illustrates the angles with which the lights U and D emitted from the upper end and the lower end of the image formed on the EPE 11 enter the observing point at the eye box center, according to the above rule, in the side view of the ocular optical system. FIG. 10A illustrates the angles with which the lights RU, LU, RD and LD emitted from the right and left edges of the upper side and the right and left edges of the lower side of the image formed on the EPE 11 enter the observing point at the eye box center in the top view of the ocular optical system.

As shown in FIG. 10A, when the visual line direction is not orthogonal to the surface of the EPE 11 (specifically, the angle θ of the EPE 11 with respect to the visual line direction is much larger than 90 degrees), the angle with which the lights LD and RD corresponding to the lower side of the virtual image enters the eyes is larger than the angle with which the lights LU and RU corresponding to the upper side of the virtual image enters the eyes. By this fact, when the visual line direction is not orthogonal to the surface of the EPE 11, it is understood that the fan-shape distortion expanding in the lower direction occurs as shown in FIG. 7A.

Figure 11A:
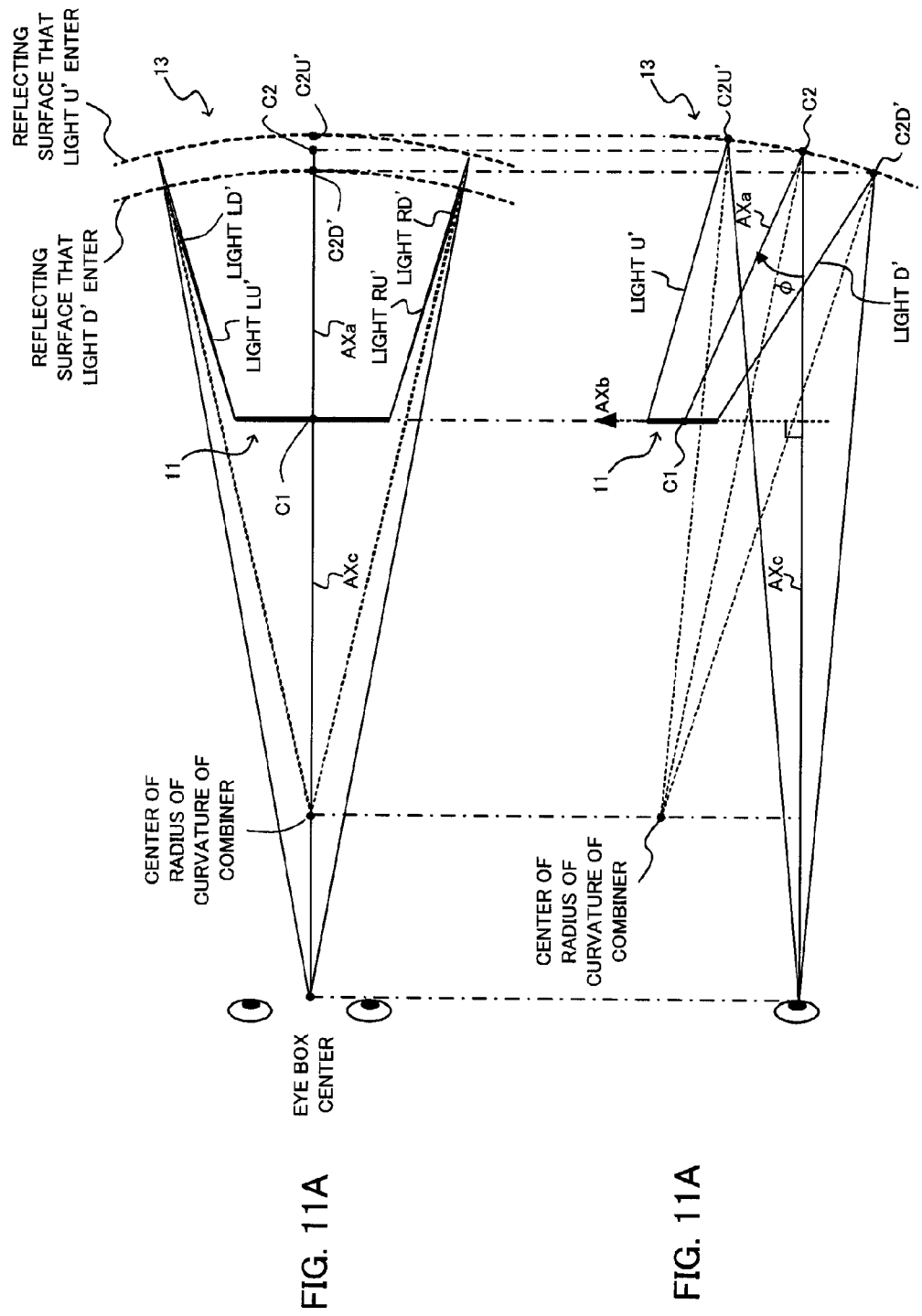

FIGS. 11A and 11B are diagrams showing the case where the EPE 11 is arranged in the direction orthogonal to the visual line direction (i.e., the angle θ between the axis AXc and the axis AXb is 90 degrees). FIG. 11A corresponds to a top view of the ocular optical system, and FIG. 11B corresponds to a side view of the ocular optical system. Specifically, FIG. 11B corresponds to the diagram in which the ocular optical system shown in FIG. 3 is rotated in the clockwise direction by the angle φ.

Similarly to FIG. 10B, FIG. 11B illustrates the angles with which the lights UT and D' emitted from the upper end and the lower end of the image formed on the EPE 11 enter the observing point at the eye box center in the side view of the ocular optical system. Similarly to FIG. 10A, FIG. 11A illustrates the angles with which the lights RU', LU', RD' and LD' emitted from the right and left edges of the upper end and the right and left edges of the lower end of the image formed on the EPE 11 enter the observing point at the eye box center in the top view of the ocular optical system.

As shown in FIG. 11A, when the visual line direction is orthogonal to the surface of the EPE 11 (specifically, the angle θ of the EPE 11 with respect to the visual line direction is 90 degrees), the angle with which the lights LU' and RU' corresponding to the upper side of the virtual image enter the eyes is substantially equal to the angle with which the lights LD' and RD' corresponding to the lower side of the virtual image enter the eyes. By this fact, when the visual line direction is orthogonal to the surface of the EPE 11, it is understood that the inclination of the vertical lines in the virtual image substantially disappears, and the distortion of the virtual image is very small as shown in FIG. 7B.

While the above description shows the result in the case where the radius of curvature of the combiner 13 is 400 mm, it will be described below that this embodiment can be applied even if the radius of curvature of the combiner 13 is not 400 mm. In addition, it will be described that the effect of the above embodiment can be obtained even if the angle θ of the EPE 11 with respect to the visual line direction is around 90 degrees.

Here, the result in the case where the radius of curvature of the combiner 13 is 400 mm is compared with the result in the case where the radius of curvature of the combiner 13 is 500 mm. The simulation was performed with the following parameters. The case where the radius of curvature of the combiner 13 is 400 mm is suitably expressed as "R400", and the case where the radius of curvature of the combiner 13 is 500 mm is suitably expressed as "R500".

Angle φ between the light entering the center C2 of the combiner 13 from the center C1 of the EPE 11 and the reflected light (the angle between the straight line AXa and the axis AXc): 24 degrees Interval between the center C2 of the combiner 13 and the eye point: 500 mm Intermediate image size formed on the EPE 11: Horizontal length 75 mm×Vertical length 25 mm (The shape of the intermediate image is the lattice image as shown in FIG. 5, in which squares with no distortion are aligned)

Distance from the eyes to the virtual image: 1500 mm

Radius of curvature of R400 combiner 13: 400 mm

Figure 12B:
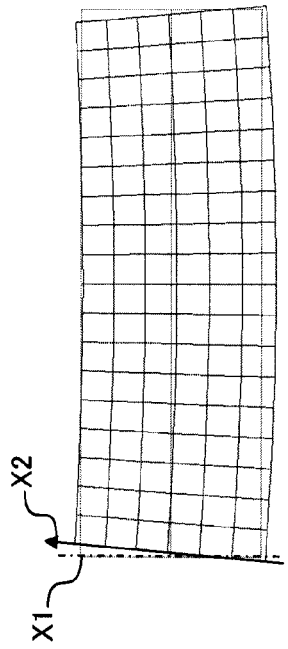
FIGS. 12A to 12C show the relation of the angle between the EPE and the visual line direction and the distortion amount of the virtual image, for each radius of curvature of the combiner.
Figure 12C:
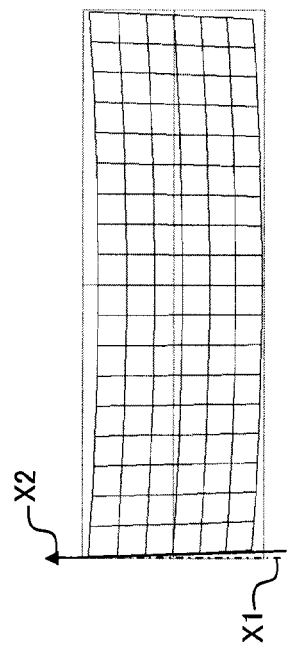
Figure 12A:
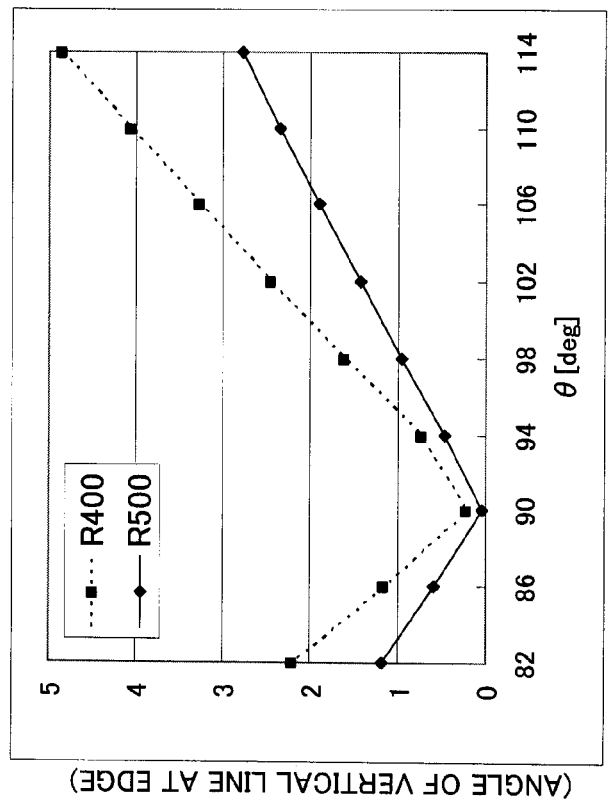

Interval between the center C1 of the EPE 11 and the center C2 of R400 combiner 13 (distance measured along the straight line AXa): 170 mm Reference screen size used for R400 combiner 13: Horizontal length 450 mm×Vertical length 150 mm Radius of curvature of R500 combiner 13: 500 mm Interval between the center C1 of the EPE 11 and the center C2 of R500 combiner 13 (distance measured along the straight line AXa): 200 mm Reference screen size used for R500 combiner 13: Horizontal length 360 mm×Vertical length 120 mm FIGS. 12A to 12C show examples of the simulation result of R400 and R500. Here, the results in the case where the field lens 12 is not used are shown. FIG. 12A shows the distortion amounts of the virtual image of R400 and R500 in the case where the angle θ of the EPE 11 with respect to the visual line direction is set to various values. The "distortion amount of the virtual image" is defined as an absolute value of the angle of the vertical line at the edge of the virtual image as shown by the solid arrow X2 in FIGS. 12B and 12C with respect to the vertical line of the frame as shown by the dashed line X1 in FIGS. 12B and 12C. FIG. 12B shows the distortion of the virtual image observed at the eye box center when the angle θ of the EPE with respect to the visual line direction is set to "114 degrees" in case of using R400, and FIG. 11C shows the distortion of the virtual image observed at the eye box center when the angle θ of the EPE with respect to the visual line direction is set to "82 degrees" in case of using R400.

From FIG. 12A, it is understood that the angle θ which minimizes the distortion amount of the virtual image is 90 degrees regardless of the radius of curvature of the combiner 13 being 400 mm or 500 mm. Namely, regardless of the the radius of curvature of the combiner 13 being 400 mm or 500 mm, the optimum set value for the angle θ of the EPE 11 does not change.

From FIG. 12A, it is understood that the distortion amount of the virtual image becomes smallest when the angle θ of the EPE 11 with respect to the visual line direction is 90 degrees, but the distortion amount of the virtual image is small when the angle θ is close to 90 degrees. It is proved from this result that, if the angle θ of the EPE 11 with respect to the visual line direction is not set to 90 degrees, if the angle θ of EPE 11 with respect to the visual line direction is set to the angle around 90 degrees, the effect of the present invention, i.e., the reduction of the distortion of the virtual image can be obtained.

On the other hand, from FIG. 12A, it is understood that the trapezoidal distortion of the virtual image expanding in the lower direction occurs if the angle θ of the EPE 11 with respect to the visual line direction is larger than 90 degrees, and the trapezoidal distortion of the virtual image expanding in the upper direction occurs if the angle θ of the EPE 11 with respect to the visual line direction is smaller than 90 degrees. In addition, from FIGS. 12B and 12C, it is understood that the aspect ratio largely deviates from its ideal state if the angle θ of the EPE 11 with respect to the visual line direction is the value largely different from 90 degrees.

(Comparison with Reference)

Here, the configuration of this embodiment is compared with the configuration of the Patent Reference 3 (Japanese Patent Application Laid-open under No. 2009-150947) mentioned above.

The Patent Reference 3 appears to disclose the configuration, similar to this embodiment, in which the EPE is arranged in the direction orthogonal to the visual line direction. However, in the configuration of the Patent Reference 3, the magnifying mirror (mirror) is arranged between the EPE (screen) and the combiner (front shield). In the configuration of this embodiment, the light emitted from the EPE 11 enters the combiner 13 without being reflected by other mirror (optical element). In contrast, in the configuration of the Patent Reference 3, the light emitted from the EPE is reflected by the magnifying mirror, and the light reflected by the magnifying mirror enters the combiner. In the configuration in which the magnifying mirror is arranged between the EPE and the combiner (i.e., a substantially plane combiner is arranged between the EPE and the combiner), even if the EPE is arranged in the direction orthogonal to the visual line direction, it is not possible to obtain the effect of reducing the distortion of the virtual image at the time of observing it with both eyes, like this embodiment.

[2nd Embodiment]

Next, the second embodiment of the present invention will be described. The second embodiment is different from the first embodiment in that the distortion of the image formed on the EPE 11 is corrected by the light emitted by the laser projector 1. Specifically, the second embodiment corrects the distortion of the image formed on the EPE 11, which possibly occurs because the light emitted by the laser projector 1 does not perpendicularly enter the EPE 11 in such an arrangement that the light emitted by the laser projector 1 does not perpendicularly enter the EPE 11.

Figure 13A:
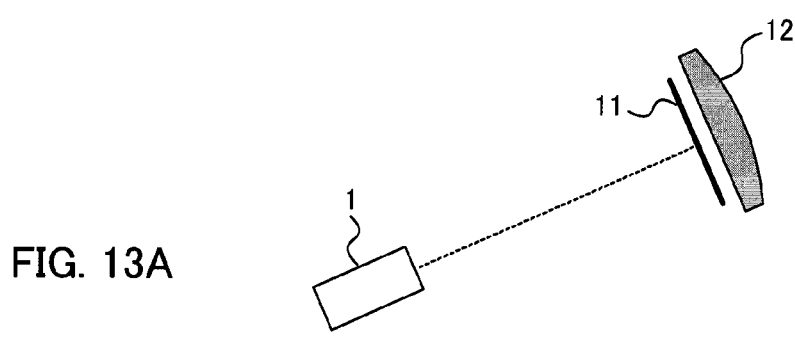
FIGS. 13A and 13B are concrete examples of the arrangement state of the laser projector and the EPE.
Figure 13B:
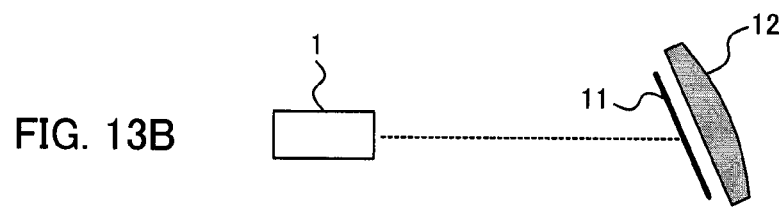

In the following, the description of the same configuration as the first embodiment will be properly omitted. Also, the configuration not described here is assumed to be the same as the first embodiment. For example, the configuration that the angle θ of the EPE 11 with respect to the visual line direction is set to substantially 90 degrees is also applied to the second embodiment FIGS. 13A and 13B show the specific example of the arrangement of the laser projector 1 and the EPE 11. FIG. 13A shows the arrangement in which the light from the laser projector 1 perpendicularly enters the EPE 11. In this arrangement, the light for drawing the center of the image is projected perpendicularly to the EPE 11 from the laser projector 1. FIG. 13B shows the arrangement in which the light from the laser projector 1 does not perpendicularly enter the EPE 11. In this arrangement, the light for drawing the center of the image is projected obliquely to the EPE 11 from the laser projector 1 with a certain incident angle (≠0 degree).

When the arrangement shown in FIG. 13B is applied, there is a possibility that trapezoidal distortion occurs in the image formed on the EPE 11 (meaning a real image, the same apply in the following description.). The second embodiment performs processing to correct such trapezoidal distortion. When the arrangement shown in FIG. 13A is applied, basically the trapezoidal distortion does not occur in the image formed on the EPE 11. However, in the arrangement of FIG. 13A, it is difficult to ensure the head clearance if the virtual image display device 100 is set at the upper part of the vehicle compartment. Therefore, the arrangement of FIG. 13B is more advantageous than the arrangement of FIG. 13A in view of ensuring the head clearance when the virtual image display device 100 is set at the upper part of the vehicle compartment.

Figure 14A:
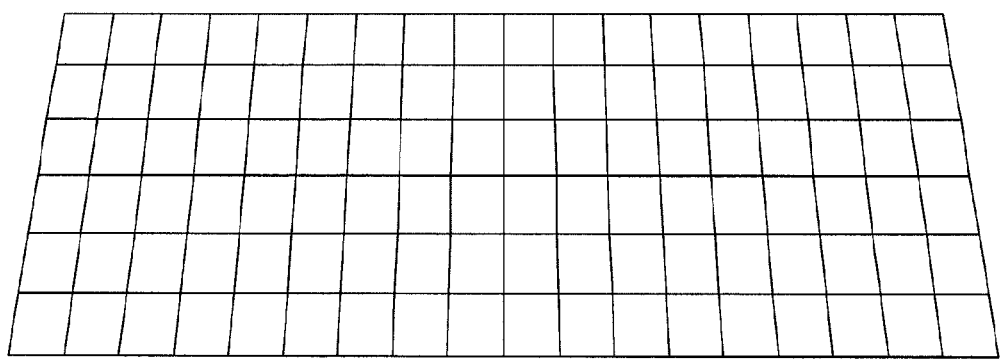
FIGS. 14A and 14B are diagrams for explaining a method of correcting the distortion of the image formed on the EPE.
Figure 14B:
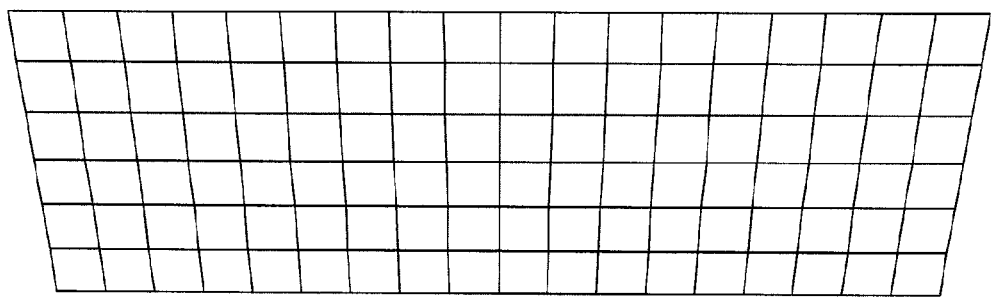

FIGS. 14A and 14B are diagrams for explaining the method of correcting the trapezoidal distortion of the image formed on the EPE 11. FIG. 14A shows a specific example of the trapezoidal distortion of the image formed on the EPE 11, which possibly occurs when the arrangement shown in FIG. 13B is applied. The second embodiment performs the processing of drawing the image for cancelling the trapezoidal distortion on the EPE 11 by the laser projector 1. Specifically, by drawing such an image that the length gradually changes from the upper side to the lower side as shown in FIG. 14B with compressing the vertical width of the inputted image, the lattice image without distortion as shown in FIG. 5 is formed on the EPE 11.

In one example, the laser driver ASIC 7 (see. FIG. 2) performs the control of changing the light emitting period of the laser LDs in the laser light source unit 9 (i.e., the control of changing the light emitting timing of the laser LD), and thereby the laser projector 1 draws the image as shown in FIG. 14B such that the number of the pixels do not change at any horizontal line of the image formed on the EPE 11. In this example, the laser driver ASIC 7 controls the light emitting period of the laser LD to be gradually short from the upper part to the lower part of the image formed on the EPE 11 (i.e., controls the light emitting period of the laser LD to be gradually long from the lower part to the upper part of the image formed on the EPE 11). At the same time, the MEMS control unit 8 controls the MEMS mirror 10 to narrow the interval of the drawn horizontal lines with respect to the inputted image, i.e., increase the linear density.

In another example, the video ASIC 3 in the laser projector 1 (see. FIG. 2) performs the image processing of the image inputted from the image signal input unit 2, thereby to draw the image as shown in FIG. 14B on the EPE 11. In this example, the video ASIC 3 performs the image processing to deform the original image inputted by the image signal input unit 2 to the image as shown in FIG. 14B. Thus, the laser driver ASIC 7 and the video ASIC 3 in the laser projector 1 correspond to an example of the "correcting unit" in the present invention.

According to the second embodiment described above, it is possible to appropriately correct the distortion of the image formed on the EPE 11, caused by the light emitted by the lase projector 1 that does not perpendicularly enter the EPE 11. Therefore, when the virtual image display device 100 is set in the vehicle compartment, it is possible to adopt the appropriate arrangement of ensuring the head clearance, with suppressing the occurrence of the disadvantage such as the distortion of the image formed on the EPE 11.

[3rd Embodiment]

Next, the third embodiment of the present invention will be described. The third embodiment is different from the first and second embodiments described above in that, when the tilt angle of the combiner 13 around the axis AXe is changed, the tilt angle of the EPE 11 around the axis AXd is automatically changed in accordance with the changed tilt angle. Specifically, in the third embodiment, the control of changing the tilt angle of the EPE 11 around the axis AXd (hereinafter referred to as "the tile angle of the EPE 11") such that the EPE 11 is arranged in the direction substantially orthogonal to the visual line direction is performed when the angle of the combiner 13 around the axis AXe (hereinafter referred to as "the tilt angle of the combiner 13") is changed.

When the virtual image display device is set and used in the vehicle compartment, the eye point of the driver, who is a user, changes in accordance with his sitting height, and therefore the driver tends to adjust the tilt angle of the combiner 13. In this view, in the third embodiment, assuming that the driver changes the tilt angle of the combiner 13, when the tilt angle is changed, the tilt angle of the EPE 11 is automatically changed accordingly.

Figure 15:
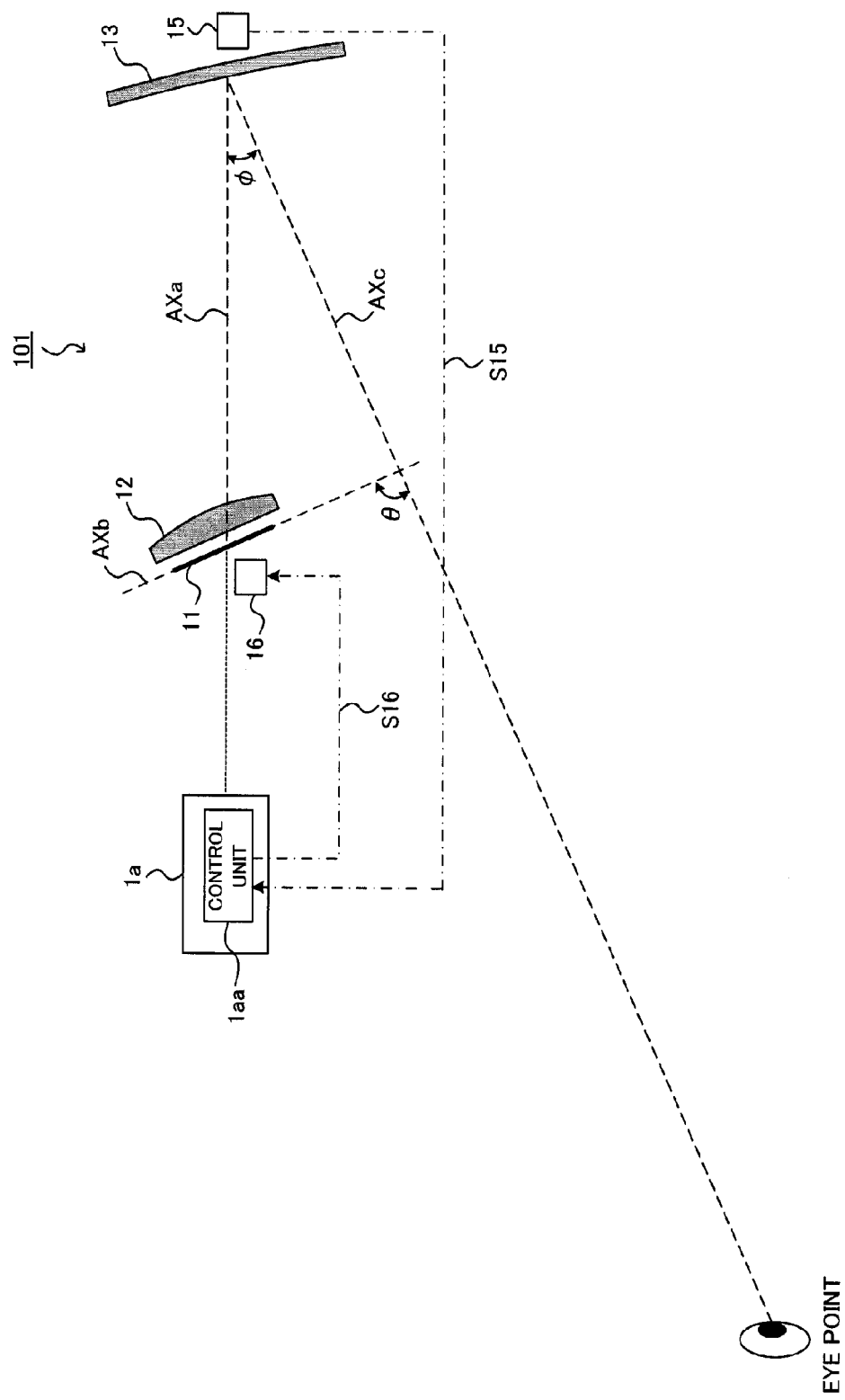
FIG. 15 shows an entire configuration of a virtual image display device according to the third embodiment.

FIG. 15 is a block diagram schematically showing an entire configuration of the virtual image display device 101 according to the third embodiment. The same constitutional elements as those in the virtual image display device 100 of the first embodiment (see. FIGS. 1 and 3A) are shown by the same reference numerals, and the description thereof will be omitted.

The virtual image display device 101 according to the third embodiment is different from the virtual image display device 100 according to the first embodiment in that it includes the laser projector 1a instead of the laser projector 1 and it further includes an angle sensor 15 and an actuator 16. The angle sensor 15 detects the tilt angle of the combiner 13. The actuator 16 performs the control of changing the tilt angle of the EPE 11. The laser projector 1a has the same configuration as the laser projector 1, and has a control unit 1aa for controlling the actuator 16.

The control unit 1aa in the laser projector 1a obtains the detection signal S15 corresponding to the tilt angle detected by the angle sensor 15, and supplies the control signal S16 for changing the tilt angle of the EPE 11 to the actuator 16 based on the detection signal S15. Specifically, the control unit 1aa performs the control of changing the tile angle of the EPE 11, in accordance with the tilt angle of the combiner 13, such that the angle θ of the EPE 11 with respect to the virtual line direction becomes substantially 90 degrees. For example, the control unit 1aa obtains the angle φ between the straight line AXa and the axis AXc from the tilt angle detected by the angle sensor 15, and set the EPE 11 to the tilt angle of the EPE 11 corresponding to the angle φ thus obtained by referring to a table which prescribes the tilt angle of the EPE 11 to be set for the angle φ. In this table, the relation between the angle φ and the tilt angle of the EPE 11 is prescribed in advance when the angle θ of the EPE 11 with respect to the visual line direction becomes 90 degrees. The control unit 1aa and the actuator 16 correspond to an example of "a tilt changing unit" in the present invention.

Next, with reference to FIGS. 16A to 16D and 17A to 17D, the description will be given of the simulation result in the case where the tilt angle of the EPE 11 is changed in accordance with the angle φ between the straight line AXa and the axis AXc as described above. It is noted that the simulation is performed by using the same parameters as FIGS. 7A to 7C and 9A to 9C of the first embodiment, except for the angle φ between the straight line AXa and the axis AXc. In FIGS. 16A to 16D and 17A to 17D, the angle φ between the straight line AXa and the axis AXc is set to "24 degrees" in an initial state, like the first embodiment, and the case will be described wherein the angle φ changes to "32 degrees" when the combiner 13 is tilted in the counterclockwise direction around the axis AXe serving as a center axis. It is assumed that the angle θ of the EPE 11 with respect to the visual line direction is set to "90 degrees" in the initial state like the first embodiment (i.e., the EPE 11 is arranged in the direction orthogonal to the visual line direction in the initial state). Other parameters have the same value as the first embodiment.

FIGS. 16A to 16D show examples of the simulation result at the eye box center. In FIGS. 16A to 16D, the virtual image obtained by the simulation is shown by the solid line, and the shape of the reference screen is shown by the frame of dashed line.

Figure 16A:
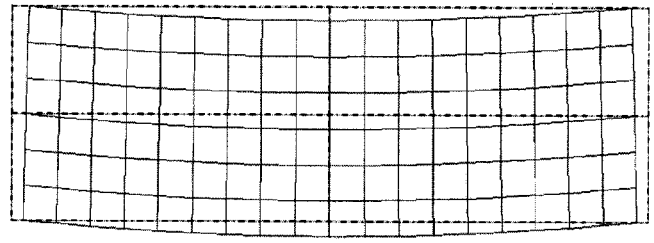
FIGS. 16A to 16D show examples of the simulation result at the eye box center in the third embodiment.

FIG. 16A shows the simulation result in the case where the tilt angle of the EPE 11 is not changed when the angle φ is changed, i.e., the tilt angle of the EPE 11 is not changed such that the angle θ of the EPE 11 with respect to the visual line direction becomes 90 degrees. In this case, it is assumed that the angle θ of the EPE 11 with respect to the visual line direction is changed from "90 degrees" to "98 degrees" . Also, FIG. 16A shows the example of the simulation result in the case where the field lens 12 is not set between the EPE 11 and the combiner 13. From FIG. 16A, it is understood that distortion of the virtual image occurs. Specifically, in comparison with the result at the initial state before changing the angle φ between the straight line AXa and the axis AXc as shown in FIG. 7B, it is understood that new distortion of the virtual image occurs.

Figure 16B:
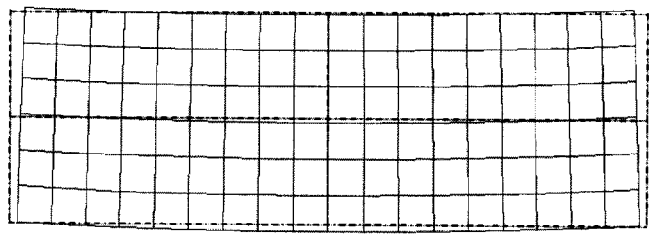

FIG. 16B shows the simulation result in the case where the tilt angle of the EPE 11 is not changed when the angle φ is changed, i.e., the tilt angle of the EPE 11 is not changed such that the angle θ of the EPE 11 with respect to the visual line direction becomes 90 degrees. In this case, it is assumed that the angle θ of the EPE 11 with respect to the visual line direction is changed from "90 degrees" to "98 degrees". Also, FIG. 16B shows the example of the simulation result in the case where the field lens 12 is set between the EPE 11 and the combiner 13. From FIG. 16B, in comparison with FIG. 16A, it is understood that the arch-shape distortion of the virtual image is suppressed. However, in comparison with the result at the initial state before changing the angle φ between the straight line AXa and the axis AXc as shown in FIG. 7C, it is understood that new distortion of the virtual image occurs.

Figure 16C:
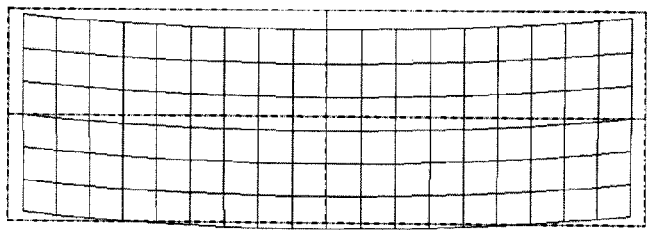

FIG. 16C shows the simulation result in the case where the tilt angle of the EPE 11 is changed in accordance with the changed angle φ, i.e., the tilt angle of the EPE 11 is changed such that the angle θ of the EPE 11 with respect to the visual line direction becomes 90 degrees. Also, FIG. 16C shows the example of the simulation result in the case where the field lens 12 is not set between the EPE 11 and the combiner 13. From FIG. 16C, in comparison with FIG. 16A, it is understood that the distortion of the virtual image is appropriately suppressed.

Figure 16D:
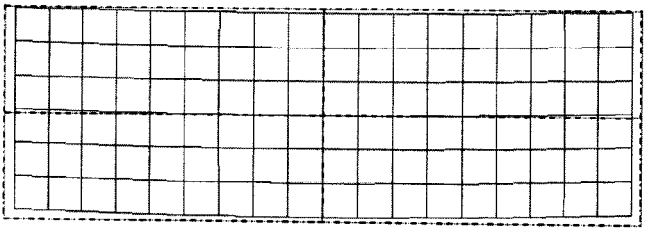

FIG. 16D shows the simulation result in the case where the tilt angle of the EPE 11 is changed in accordance with the changed angle φ, i.e., the tilt angle of the EPE 11 is changed such that the angle θ of the EPE 11 with respect to the visual line direction becomes 90 degrees. Also, FIG. 16D shows the example of the simulation result in the case where the field lens 12 is set between the EPE 11 and the combiner 13. From FIG. 16D, in comparison with FIG. 16B, it is understood that the distortion of the virtual image is appropriately suppressed. In comparison with FIG. 16C, it is understood that the arch-shape distortion of the virtual image is appropriately eliminated.

FIGS. 17A to 17D show examples of the simulation result with both eyes. In FIGS. 17A to 17D, the virtual image obtained by the simulation is shown by the solid line and the broken line, and the shape of the reference screen is shown by the dashed line. Specifically, the virtual image observed by the left eye is shown by the solid line, and the virtual image observed by the right eye is shown by the broken line.

Figure 17A:
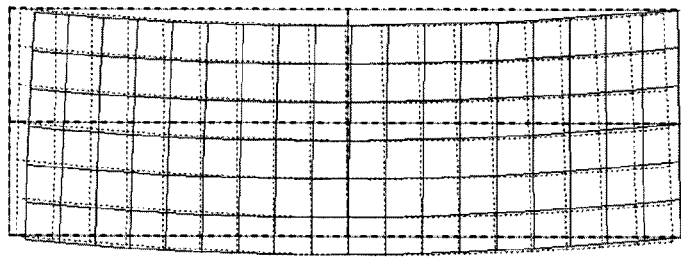
FIGS. 17A to 17D show examples of the simulation result with both eyes in the third embodiment.

FIG. 17A shows the simulation result in the case where the tilt angle of the EPE 11 is not changed when the angle φ is changed, i.e., the tilt angle of the EPE 11 is not changed such that the angle θ of the EPE 11 with respect to the visual line direction becomes 90 degrees. In this case, it is assumed that the angle θ of the EPE 11 with respect to the visual line direction is changed from "90 degrees" to "98 degrees". Also, FIG. 17A shows the example of the simulation result in the case where the field lens 12 is not set between the EPE 11 and the combiner 13. From FIG. 17A, it is understood that distortion of the virtual image occurs. Specifically, in comparison with the result at the initial state before changing the angle φ between the straight line AXa and the axis AXc as shown in FIG. 9C, it is understood that new distortion of the virtual image occurs and the difference in shape of the virtual images observed by both eyes is getting larger.

Figure 17B:
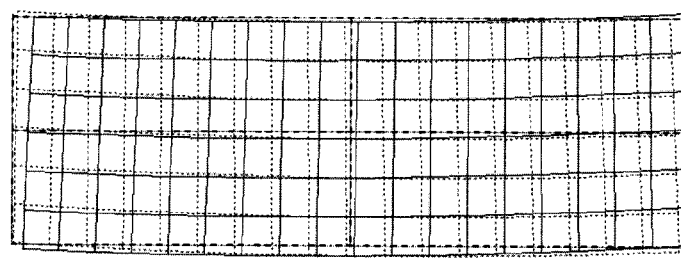

FIG. 17B shows the simulation result in the case where the tilt angle of the EPE 11 is not changed when the angle φ is changed, i.e., the tilt angle of the EPE 11 is not changed such that the angle θ of the EPE 11 with respect to the visual line direction becomes 90 degrees. In this case, it is assumed that the angle θ of the EPE 11 with respect to the visual line direction is changed from "90 degrees" to "98 degrees". Also, FIG. 17B shows the example of the simulation result in the case where the field lens 12 is set between the EPE 11 and the combiner 13. From FIG. 17B, in comparison with FIG. 17A, it is understood that the arch-shape distortion of the virtual image is suppressed. However, in comparison with the result at the initial state before changing the angle φ between the straight line AXa and the axis AXc as shown in FIG. 9C, it is understood that new distortion of the virtual image occurs and the difference in shape of the virtual images observed by both eyes is getting larger.

Figure 17C:
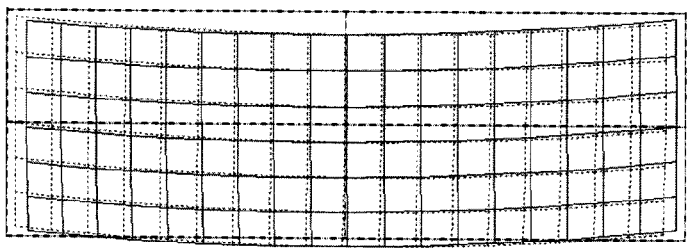

FIG. 17C shows the simulation result in the case where the tilt angle of the EPE 11 is changed in accordance with the changed angle φ, i.e., the tilt angle of the EPE 11 is changed such that the angle θ of the EPE 11 with respect to the visual line direction becomes 90 degrees. Also, FIG. 17C shows the example of the simulation result in the case where the field lens 12 is not set between the EPE 11 and the combiner 13. From FIG. 17C, in comparison with FIG. 17A, it is understood that the distortion of the virtual image is appropriately suppressed and the difference in shape of the virtual images observed by both eyes is appropriately reduced.

Figure 17D:
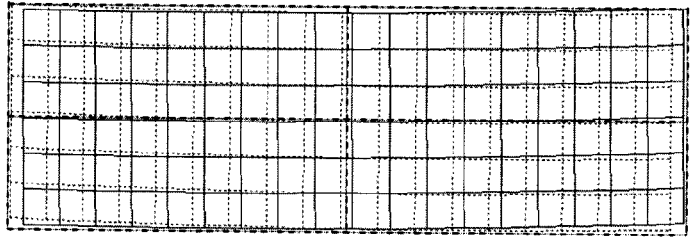

FIG. 17D shows the simulation result in the case where the tilt angle of the EPE 11 is changed in accordance with the changed angle φ, i.e., the tilt angle of the EPE 11 is changed such that the angle θ of the EPE 11 with respect to the visual line direction becomes 90 degrees. Also, FIG. 17D shows the example of the simulation result in the case where the field lens 12 is set between the EPE 11 and the combiner 13. From FIG. 17D, in comparison with FIG. 17B, it is understood that the distortion of the virtual image is appropriately suppressed and the difference in shape of the virtual images observed by both eyes is appropriately reduced. In comparison with FIG. 17C, it is understood that the arch-shape distortion of the virtual image is appropriately eliminated.

According to the third embodiment described above, by appropriately tilting the EPE 11 around the axis AXd (specifically tilting the EPE 11 such that such that the EPE 11 is arranged in the direction substantially orthogonal to the visual line direction) when the combiner 13 is tilted around the axis AXe, it is possible to appropriately suppress the distortion of the virtual image caused by tilting the combiner 13.

By the reason described in the first embodiment, it is permitted to change the tilt angle of the EPE 11 to be not strictly 90 degrees when the tilt angle of the combiner 13 is changed. Namely, the tilt angle of the EPE 11 may be changed such that the angle θ of the EPE 11 with respect the visual line direction becomes around 90 degrees.

The third embodiment may be exercised in combination with the second embodiment described above. Namely, when the tilt angle of the combiner 13 is changed, it is possible to perform the control of changing the tilt angle of the EPE 11 such that the angle θ of the EPE 11 with respect to the visual line direction becomes substantially 90 degrees and perform the processing of correcting the distortion of the image formed on the EPE 11 by the light emitted by the laser projector 1.

MODIFIED EXAMPLES

Next, modified examples of the above embodiments will be described. The modified examples presented below may be appropriately exercised in combination with the first to third embodiments described above, and may be appropriately exercised in combination with each other.

1st Modified Example

While the embodiments described above show the virtual image display devices 100, 101 in which the user upwardly views the virtual image, the first modified example relates to a display device in which the user downwardly views the virtual image.

Figure 18:
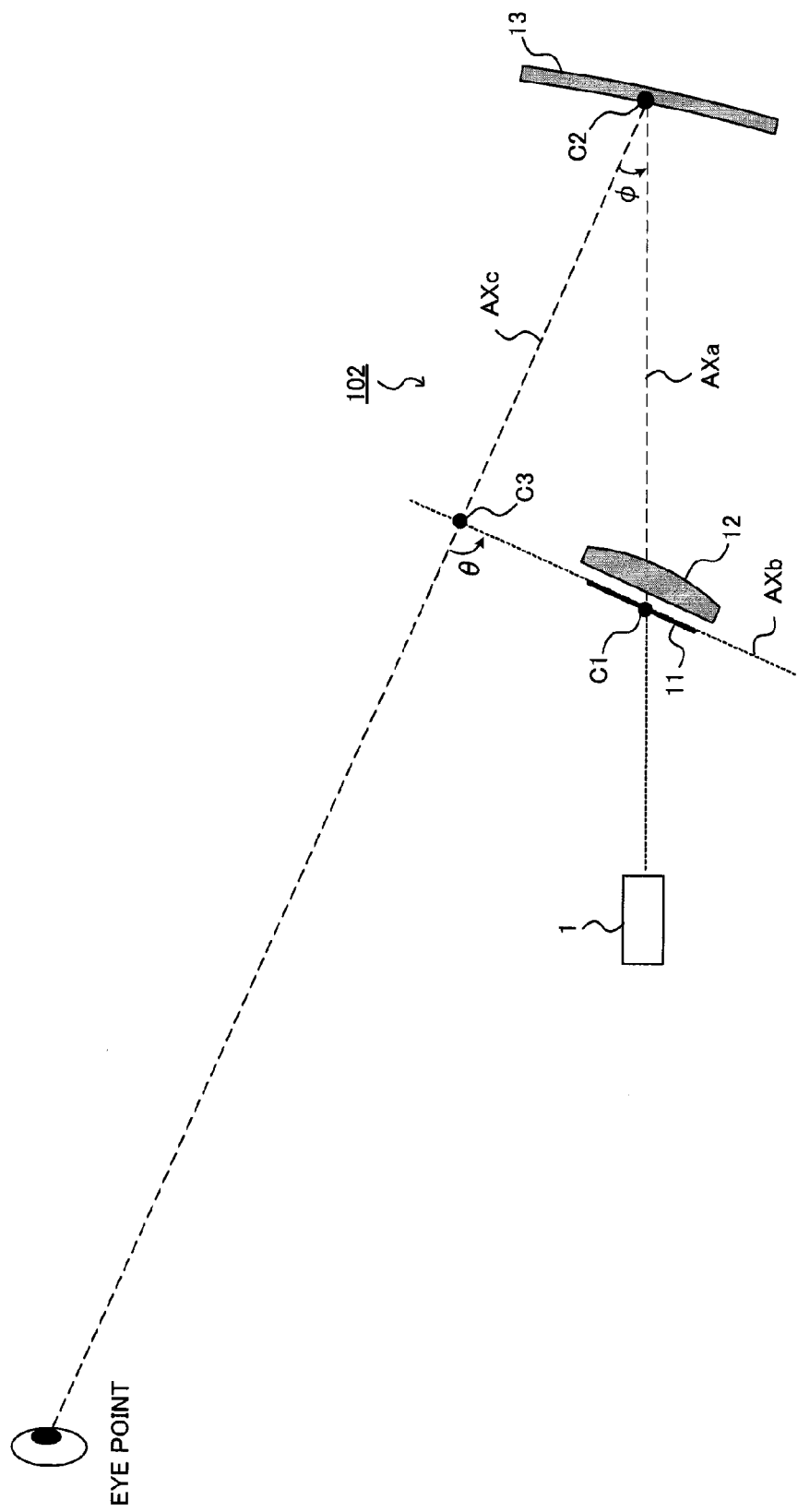
FIG. 18 shows an entire configuration of a virtual image display device according to a first modified example.

FIG. 18 is a block diagram schematically showing the entire configuration of the virtual image display device 102 according to the first modified example. The same constitutional elements as those of the virtual image display device 100 according to the first embodiment (see. FIGS. 1 and 3A) are indicated by the same reference numerals and the description thereof will be omitted.

As shown in FIG. 18, the virtual image display device 102 according to the first modified example is different from the virtual image display device 100 according to the first embodiment in that it is configured such that the user can downwardly observe the virtual image. Specifically, in the virtual image display device 100 according to the first embodiment, the EPE 11 and the combiner 13 are tilted in the counterclockwise direction with respect to the axes AXd and AXe as the center axis, respectively, such that the user can observe the virtual image by viewing upwardly. In the virtual image display device 102 according to the first modified example, the EPE 11 and the combiner 13 are tilted in the clockwise direction with respect to the axes AXd and AXe as the center axis, respectively, such that the user can observe the virtual image by viewing downwardly. In this configuration of the first modified example, similarly to the first embodiment, the EPE 11 is arranged in the direction substantially orthogonal to the visual line direction.

2nd Modified Example

The second modified example is different from the above described embodiments in that a liquid crystal display is used instead of the laser projector 1 and the EPE 11.

Figure 19:
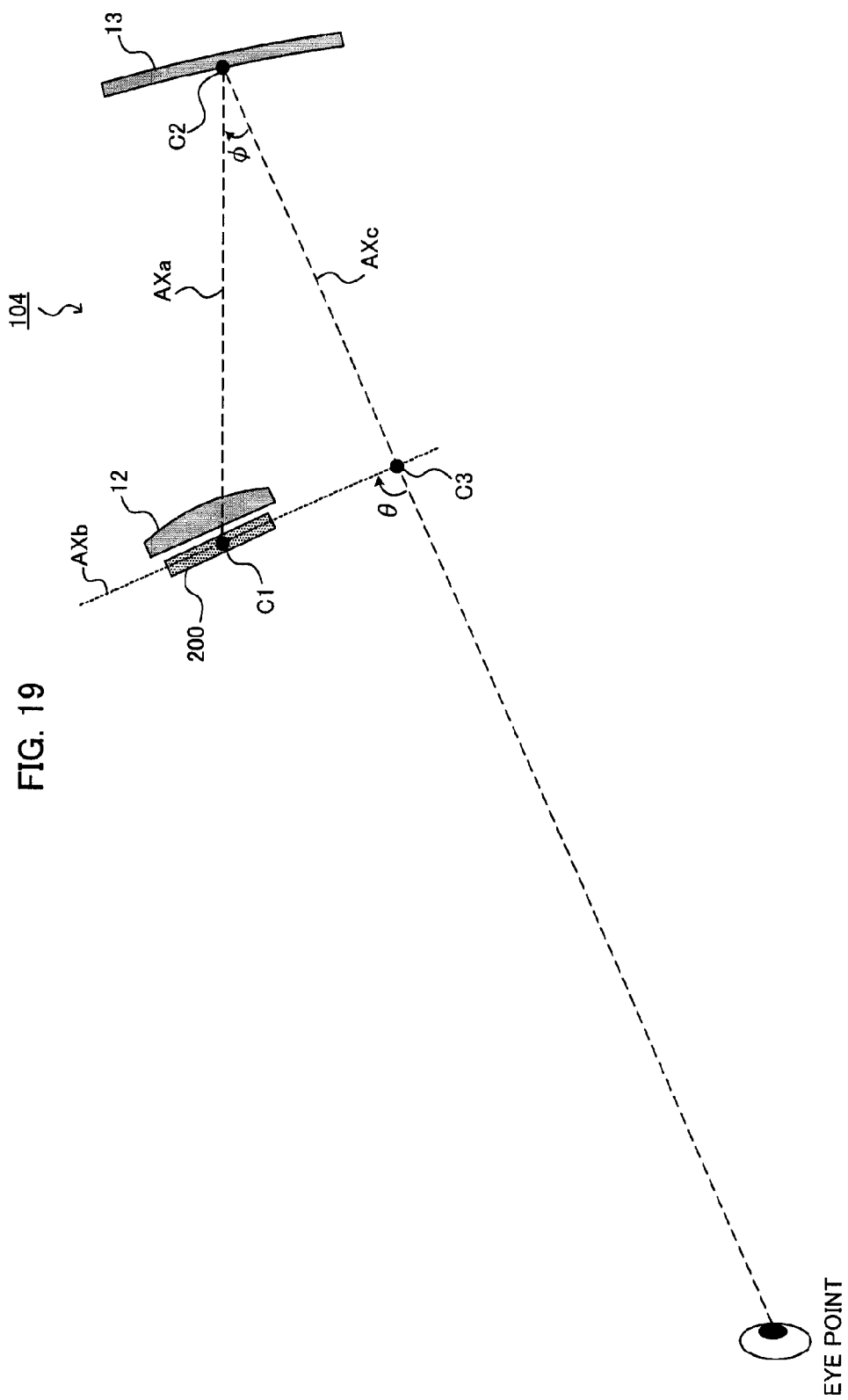
FIG. 19 shows an entire configuration of a virtual image display device according to a second modified example.

FIG. 19 is a block diagram schematically showing the entire configuration of the display device 104 according to the third modified example. The same constitutional elements as those in the virtual image display device 100 according to the first embodiment (see. FIGS. 1 and 3A) will be shown by the same reference numerals and their description will be omitted.

As shown in FIG. 19, the virtual image display device 104 according to the second embodiment is different from the virtual image display device 100 according to the first embodiment in that it has the liquid crystal display 200 instead of the laser projector 1 and the EPE 11. The liquid crystal display 200 corresponds to one example of the "image forming element" according to the present invention. Similarly to the first embodiment described above, the liquid crystal display 200 is arranged in the direction substantially orthogonal to the visual line direction.

The present invention is not limited to the use of the liquid crystal display 200 instead of the laser projector 1 and the EPE 11. In another example, an organic EL display may be used instead of the laser projector 1 and the EPE 11. In this case, the organic EL display corresponds to one example of the "image forming element" according to the present invention.

3rd Modified Example

In the third modified example, the configuration of the field lens 12 arranged on the exiting side of the EPE 11 is different from that of the embodiments described above. Specifically, the field lens according to the third modified example has a surface of convex shape to which the light from the EPE 11 enters (i.e., the incident surface), and a surface of convex shape opposite to the surface to which the light from the EPE 11 enters (i.e., the emitting surface). Namely, the field lens according to the third modified example has a biconvex spherical shape. Also, the field lens according to the third modified example is arranged such that the axis connecting its center and the center of the EPE 11 is parallel with the axis extending in the vertical direction of the EPE 11. The light emitted by the field lens enters the combiner 13. The field lens according to the third modified example corresponds to "a virtual image distortion correcting element" of the present invention.

Figure 20A:
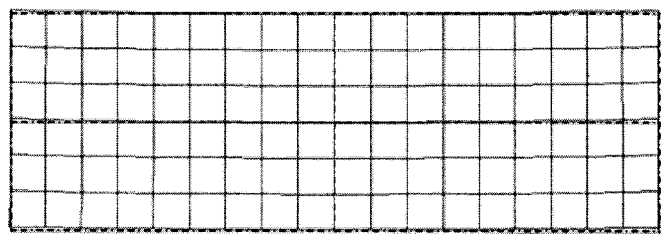
FIGS. 20A and 20B show examples of the simulation result in case of using a field lens according to a third modified example.
Figure 20B:
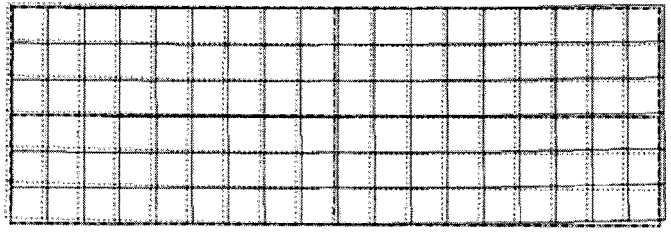

FIGS. 20A and 20B show simulation results in case of using the field lens according to the third modified example. The simulation is performed using the following parameters.

Angle $\theta$ of the EPE 11 with respect to the visual line direction (the angle between the axis AXc and the axis AXb): 90 degrees Angle $\phi$ between the light incident on the center C2 of the combiner 13 from the center C1 of the EPE 11 and the reflected light (the angle between the straight line AXa and the axis AXc): 24 degrees Interval Y1 between the center C1 of the EPE 11 and the center C2 of the combiner 13 (distance measured along the straight line AXa): 170 mm Interval Y2 between the center C2 of the combiner 13 and the eye point: 500 mm Distance from the eyes to the virtual image: 1500 mm Size of the intermediate image formed on the EPE 11: Horizontal length 75 mm×Vertical length 25 mm (The shape of the intermediate image is the lattice image as shown in FIG. 5, in which squares with no distortion are aligned)

Reference screen size: Horizontal length 450 mm×Vertical length 150 mm

Radius of curvature of the combiner 13: 400 mm (The shape of the combiner 13 is spherical)

Radius of curvature of the field lens at the incident convex surface side: 800 mm Radius of curvature of the field lens at the emitting convex surface side: 170 mm Center thickness of the field lens: 8 mm Interval between the EPE 11 and the incident surface of the field lens: 2 mm (Assuming that the centers of the EPE 11 and the field lens coincide with each other)

Refractive index of the field lens: 1.526

FIG. 20A shows the simulation result at the eye point center in case of using the field lens according to the third modified example, and FIG. 20B shows the simulation result with both eyes in case of using the field lens according to the third embodiment. From FIGS. 20A and 20B, it is understood that the distortion of the virtual image (the arch-shape distortion, etc.) can be appropriately suppressed even when the field lens of the biconvex spherical shape.

4th Modified Example

While the present invention is applied to the laser projector 1 in the above-described embodiments, the present invention can be applied to various projectors other than the laser projector 1, such as a liquid crystal projector.

5th Modified Example

The above-described embodiments are directed to the examples in which the present invention is applied to the field lens 12 and the combiner 13 formed in the spherical shape. However, the present invention may be applied to the field lens and/or the combiner formed in an aspherical shape. In addition, while the above-described embodiments are directed to the examples in which the present invention is applied to the EPE 11 formed in a plane shape, the present invention is not limited to form the EPE in the plane shape.

As described above, the embodiments are not limited to those described above, and may be appropriately altered without departing from the gist and idea of the invention readable from the claims and entire specification.

INDUSTRIAL APPLICABILITY

This invention can be used for a virtual image display device such as a head-up display and a head-mount display, which makes a user view the image as a virtual image.

DESCRIPTION OF REFERENCE NUMERALS

1 Laser projector
11 Exit-Pupil Expander (EPE)
12 Field lens
13 Combiner
15 Angle sensor
16 Actuator
100 Virtual image display device

The invention claimed is:

1. A virtual image display device comprising:
a light source which emits a light corresponding to an image to be displayed;
an image forming element which forms the image to be displayed; and
an optical element which reflects a light emitted from the image forming element to display a virtual image, the optical element having a concave shape opposite to a traveling direction of the light emitted from the image forming element,
wherein the light emitted from the image forming element enters the optical element without being reflected by another optical element,
wherein the image forming element is an exit-pupil expanding element which expands an exit-pupil of the light irradiated from a light source,
wherein the light source is arranged such that the optical axis of the light emitted from the light source enters the image forming element non-perpendicularly to an incident surface of the image forming element, and
wherein an output surface of the image forming element is arranged in a direction substantially orthogonal to a direction of viewing the virtual image through the optical element.

2. The virtual image display device according to claim 1, further comprising an angle changing unit which changes an angle of the image forming element such that the image forming element is arranged in the direction substantially orthogonal to the direction of viewing the virtual image.

3. The virtual image display device according to claim 1, further comprising a virtual image distortion correcting element arranged between the image forming element and the optical element.

4. The virtual image display device according to claim 3, wherein the virtual image distortion correcting element corrects arch-shape distortion of the virtual image caused by a curvature of the optical element.

5. The virtual image display device according to claim 1, wherein the light emitted from the image forming element directly enters the optical element.

6. The virtual image display device according to claim 1, further comprising a correcting unit which corrects distortion of the image formed on the image forming element by the light irradiated from the light source.

7. The virtual image display device according to claim 6, wherein the correcting unit corrects the distortion of the image caused by an angle of the light irradiated from the light source with respect to the image forming element.

8. The virtual image display device according to claim 1, wherein the optical element is arranged in an emitting direction of the light emitted from the image forming element.

9. The virtual image display device according to claim 1, wherein a surface of the image forming element from which the light is emitted is arranged in the direction substantially orthogonal to the direction of viewing the virtual image.

10. The virtual image display device according to claim 1, wherein the image forming element is arranged at a position where the light reflected by the optical element is not irradiated.

11. The virtual image display device according to claim 1, wherein the image forming element has a plane shape.

12. The virtual image display device according to claim 1, wherein, when an axis which perpendicularly crosses a straight line connecting a center of the image forming element and a center of the optical element and which passes through the center of the image forming element is defined, the image forming element is arranged such that an angle around the axis is substantially orthogonal to an axis corresponding to the direction of viewing the virtual image.

\* \* \* \* \*